(12) United States Patent
Langlotz

(10) Patent No.: US 10,100,174 B2
(45) Date of Patent: Oct. 16, 2018

(54) PROCESS FOR PRODUCING STABILIZED POLYACRYLAMIDES

(71) Applicant: BASF SE, Ludwigshafen (DE)

(72) Inventor: Bjoern Langlotz, Trostberg (DE)

(73) Assignee: BASF SE, Ludwigshafen am Rhein (DE)

(*) Notice: Subject to any disclaimer, the term of this patent is extended or adjusted under 35 U.S.C. 154(b) by 134 days.

(21) Appl. No.: 15/047,776

(22) Filed: Feb. 19, 2016

(65) Prior Publication Data
US 2016/0244595 A1    Aug. 25, 2016

(30) Foreign Application Priority Data

Feb. 20, 2015  (EP) .................................. 15155999

(51) Int. Cl.
  *C08K 5/47*      (2006.01)
  *C08L 33/26*     (2006.01)
  *C08F 220/56*    (2006.01)

(52) U.S. Cl.
  CPC .............. *C08K 5/47* (2013.01); *C08L 33/26* (2013.01); *C08F 220/56* (2013.01)

(58) Field of Classification Search
  CPC ........... C08K 5/47; C08L 33/26; C08F 220/56
  USPC ........................................................ 524/83
  See application file for complete search history.

(56) References Cited

U.S. PATENT DOCUMENTS

| | | | |
|---|---|---|---|
| 4,306,045 A * | 12/1981 | Yoshida | C08F 6/12 526/204 |
| 5,296,577 A | 3/1994 | Tamura et al. | |
| 5,633,329 A | 5/1997 | Hahnle et al. | |
| 7,605,196 B2 | 10/2009 | Schinabeck et al. | |
| 7,619,046 B2 | 11/2009 | Broughton et al. | |
| 7,700,702 B2 | 4/2010 | Gaillard et al. | |
| 2012/0058922 A1* | 3/2012 | Favero | C08K 5/005 507/226 |
| 2014/0080914 A1 | 3/2014 | Kanou et al. | |
| 2016/0200969 A1 | 7/2016 | Reichenbach-Klinke et al. | |

FOREIGN PATENT DOCUMENTS

| | | |
|---|---|---|
| CA | 2760734 A1 | 11/2010 |
| CA | 2818847 A1 | 5/2012 |
| DE | 2256115 A1 | 9/1973 |
| DE | 3021767 A1 | 12/1980 |
| DE | 102004032304 A1 | 2/2006 |
| GB | 1054028 A | 1/1967 |
| JP | S4927660 B1 | 7/1974 |
| JP | S4927661 B1 | 7/1974 |
| JP | S4927662 B1 | 7/1974 |
| WO | WO-2010133258 A1 | 11/2010 |
| WO | WO-2010133527 A2 | 11/2010 |
| WO | WO-2012069478 A1 | 5/2012 |
| WO | WO-2015024865 A1 | 2/2015 |
| WO | WO-2015158517 A1 | 10/2015 |

OTHER PUBLICATIONS

International Search Report for PCT/EP2016/053515, dated May 6, 2016.
Taylor, K., et al., "Water-soluble hydrophobically associating polymers for improved oil recovery: A literature review", Journal of Petroleum Science and Engineering, 1998, vol. 19, pp. 265-280.

* cited by examiner

*Primary Examiner* — Ling Siu Choi
*Assistant Examiner* — Ronald Grinsted
(74) *Attorney, Agent, or Firm* — Drinker Biddle & Reath LLP

(57) ABSTRACT

The present application relates to a process for producing a composition comprising at least one acrylamide polymer P and at least one stabilizer St, wherein the acrylamide polymer P is obtained in the form of a polymer gel, and the acrylamide polymer gel having a water content in the range from 50% to 80% by weight, based on the overall polymer gel, is treated with an aqueous solution SS comprising at least one stabilizer St selected from the group consisting of sulfur compounds, N-oxides, organic nitroso compounds, aromatic hydroxyl compounds and ketones.

21 Claims, No Drawings

PROCESS FOR PRODUCING STABILIZED POLYACRYLAMIDES

CROSS-REFERENCE TO RELATED APPLICATIONS

This application claims priority to European Application No. 15155999.4, filed Feb. 20, 2015, which is incorporated herein by reference in its entirety.

The present application relates to a process for producing a composition comprising at least one acrylamide polymer P and at least one stabilizer St, wherein the acrylamide polymer P is obtained in the form of a polymer gel, and the acrylamide polymer gel having a water content of at least 30% by weight, based on the overall polymer gel, is treated with an aqueous solution SS comprising at least one stabilizer St selected from the group consisting of sulfur compounds, N-oxides, organic nitroso compounds, aromatic hydroxyl compounds and ketones.

High molecular weight homopolyacrylamide and water-soluble polyacrylamide copolymers, for example acrylamide-acrylic acid copolymers, are known in principle. They are used in many fields of industry, for example as thickeners, flocculants, strengtheners for paper, for oil production or for mining applications.

It is additionally known that thickening water-soluble poly(meth)acrylamide or poly(meth)acrylamide copolymers can be used for tertiary mineral oil production, especially in what is called polymer flooding. For example, it is possible to use copolymers of (meth)acrylamide, acrylic acid and/or sulfo-functional monomers such as ATBS (2-acrylamido-2-methylpropane-1-sulfonic acid, $H_2C=CH-CO-NH-C(CH_3)_2-CH_2-SO_3H$). Additionally known is the use of what are called hydrophobically associating (meth)acrylamide copolymers in the mineral oil production sector, especially for tertiary mineral oil production (enhanced oil recovery, EOR). These hydrophobically associating copolymers are described, for example, in WO 2010/133527. Details of the use of hydrophobically associating copolymers for tertiary mineral oil production are described, for example, in the review article by Taylor, K. C. and Nasr-El-Din, H. A. in J. Petr. Sci. Eng. 1998, 19, 265-280.

Polymer flooding involves forcing dilute aqueous polymer solutions through an injection well into a mineral oil-bearing underground formation. These polymer solutions flow through fine cavities in the formations in the direction of the production well. As they do so, the polymer solutions force the mineral oil and possibly the formation water in the direction of the production well, such that a mixture of mineral oil and water is produced through the production well. The use of viscous, aqueous polymer solutions rather than water has the advantage that the polymer solution normally flows through the formation more homogeneously than water and, as a result, more oil is mobilized than when water is used alone. Methods of polymer flooding are described, for example, in WO 2012/069478 and WO 2015/024865 A1.

The acrylamide polymers used in polymer flooding typically have a high molecular weight required to attain the desired thickening action. Typically, the molecular weight ($M_w$) is at least $10^6$ (1 million) g/mol, for example in the range from 1 to 30 million g/mol. Even minor polymer degradation distinctly reduces the molecular weight in such high molecular weight polymers. This generally significantly lowers the viscosity of the polymer solution, which is extremely undesirable for use in tertiary mineral oil production (EOR).

The use of acrylamide polymers in polymer flooding places high demands on the stability of the polymers. Polymer flooding typically involves pumping aqueous polymer solutions through the underground rock formation over a period of several months up to several years. The deposit temperature of mineral oil deposits is typically above room temperature, for example 30° C. to 120° C.

One cause of the chemical degradation of polymers may be the presence of oxygen in the polymer solution. The polymer solutions are typically produced on the oilfield by dissolving solid polymer powders in suitable dissolution facilities, in the course of which attempts are made to exclude oxygen, for example by working under protective gas (such as $N_2$) and/or using free-radical scavengers (for example sodium bisulfite or hydrazine) and sacrificial reagents. Free-radical scavengers are frequently used in combination with sacrificial reagents.

In view of the large amounts of polymer solution required in polymer flooding, the production of the polymer solution under protective gas is inconvenient and costly. In order to assure the stability of the acrylamide polymers at elevated temperature and over the long period of time, it is therefore normally necessary to add various stabilizers to counteract the harmful influence of light, oxygen and heat. More particularly, oxygen scavengers, free-radical scavengers (for example thiourea, mercaptobenzothiazole (MBT) or sodium thiocyanate (NaSCN)), sacrificial reagents (e.g. alcohols such as 2-propanol, isopropanol), precipitants and complexing agents are used. The various stabilizers commonly used in tertiary mineral oil production are described, for example, in WO 2010/133258.

WO 2015/024865 A1 describes stabilizers for acrylamide polymers, especially sterically hindered piperidine derivatives.

Stabilizers of this kind can be added by the user on dissolution of the solid polymers. However, many users prefer to use ready-to-use compositions already comprising the acrylamide polymer and the stabilizer, because this reduces complexity on use. The production of compositions from polyacrylamides and polyacrylamide copolymers already comprising one or more stabilizers can be effected in various ways.

JP 74027659 B describes the preparation of polyacrylamides by polymerization of acrylamide in aqueous solution, wherein a stabilizer is added to the aqueous solution after the polymerization. Subsequently, polymer and stabilizer are precipitated together out of the aqueous solution by means of suitable precipitants and dried.

WO 2015/158517 A1 describes a free-radical polymerization process for preparing acrylamide polymers in the presence of a stabilizer for preventing polymer degradation by molecular oxygen.

The preparation can be effected by treating acrylamide polymer pellets with a solution of the stabilizers. This procedure has the drawback that the stabilizer has been applied only superficially. In the course of transport of the polymer pellets, the surface may be abraded. The fines fraction having a high stabilizer content typically collects in the bottom of the transport vessel, while the coarse polymer material above is deficient in stabilizer.

It is also possible to dissolve the polymer and the stabilizer in water and to precipitate a mixture of polymer and stabilizer, but this involves an additional and complex process step.

There are also known techniques in which a stabilizer is added as early as in the course of preparation of the polyacrylamides, for example by the gel polymerization process. U.S. Pat. No. 5,296,577 describes a process for preparing polyacrylamides by free-radical polymerization of acrylamide and optionally further comonomers in an aqueous medium in the presence of azo initiators and at least 0.1% by weight of the stabilizer 2-mercaptobenzthiazole or a salt thereof at a pH of at least 6 within a temperature range from 5 to 100° C. under adiabatic conditions.

DE 30 21 767 A1 describes a process for preparing high molecular weight polyacrylamides by free-radical polymerization in an aqueous medium, in which the polymerization is conducted in the presence of 2-mercaptobenzimidazole. The polymerization can be conducted within the temperature range from 0° C. to 100° C. In the exemplary described process in a first step the polymerization reaction is carried out, followed by the addition of the stabilizer 2-mercaptobenzimidazole and then kneading for 3 hours at 65° C., wherein a partial hydrolysis occurs.

It has now been found that, surprisingly, advantageous stabilization of acrylamide polymer solutions, for example for use in polymer flooding, can be achieved when the polymer gel which is obtained after the gel polymerization of the (meth)acrylic monomers, preferably without prior drying, is treated with the stabilizer or an aqueous stabilizer solution. In this case, it is advantageously possible to maintain the high viscosity of the acrylamide polymer solutions needed for polymer flooding at elevated temperature (about 80° C.) and over a long period (especially over several weeks).

The present invention relates to a process for producing a composition comprising at least one acrylamide polymer P and at least one stabilizer St, comprising the following steps:
a) providing an aqueous monomer solution MS comprising 20% to 45% by weight, based on the total amount of all the components of the aqueous monomer solution MS, of at least one ethylenically unsaturated monomer, at least one monomer being (meth)acrylamide, at least one initiator I for the free-radical polymerization, preferably at least one thermal initiator I for the free-radical polymerization, and at least one solvent So comprising at least 50% by weight, based on the overall solvent So, of water,
b) polymerizing the aqueous monomer solution MS, preferably under essentially adiabatic conditions in a gel polymerization, to obtain the acrylamide polymer P in the form of a polymer gel;
c) treating the polymer gel having a water content of at least 30% by weight, preferably of at least 50% by weight, based on the overall polymer gel, with an aqueous solution SS comprising at least one stabilizer St selected from the group consisting of sulfur compounds, N-oxides, organic nitroso compounds, aromatic hydroxyl compounds and ketones;
d) optionally drying the polymer gel from step c).

The present invention particularly relates to a process for producing a composition comprising at least one acrylamide polymer P and at least one stabilizer St, comprising the following steps:
a) providing an aqueous monomer solution MS comprising 20% to 45% by weight, based on the total amount of all the components of the aqueous monomer solution MS, of at least one ethylenically unsaturated monomer, at least one monomer being (meth)acrylamide, at least one initiator I for the free-radical polymerization, preferably at least one thermal initiator I for the free-radical polymerization, and at least one solvent So comprising at least 50% by weight, based on the overall solvent So, of water;
b) polymerizing the aqueous monomer solution MS, preferably under essentially adiabatic conditions in a gel polymerization, to obtain the acrylamide polymer P in the form of a polymer gel;
c) treating the polymer gel having a water content in the range from 50 to 80% by weight based on the overall polymer gel, with an aqueous solution SS comprising at least one stabilizer St selected from the group consisting of sulfur compounds, N-oxides, organic nitroso compounds, aromatic hydroxyl compounds and ketones;
d) optionally drying the polymer gel from step c).

By the process of the invention, it is possible to obtain acrylamide polymers P having improved stability to free-radical degradation (storage stability) compared to the prior art. The acrylamide polymers P obtained by the process of the invention surprisingly have the following further advantages compared to the prior art:
better filterability (e.g. Millipore filtration ratio, MPFR) of the acrylamide polymers P;
decrease in insoluble gel fractions in the acrylamide polymers P;
increase in viscosity of the resulting polymer solution of the acrylamide polymers P.

The process of the invention for producing a composition comprising at least one acrylamide polymer P and at least one stabilizer St comprises the free-radical polymerization of the aqueous monomer solution MS by a gel polymerization process. In this process, the monomers are used in a comparatively high concentration in aqueous solution, namely typically from 20% to 45% by weight. Because of the high concentration, the mixture does not remain liquid over the course of polymerization, but becomes a solid, water-containing polymer gel. The stirring of the mixture over the course of the polymerization is of course not possible because of the high viscosity. The polymer gel can be comminuted and dried after the polymerization. In this procedure, added auxiliaries and additives necessarily remain in the polymer preparation.

A polymer gel in the context of the present invention is understood to mean a composition comprising polymer and at least 30% by weight, preferably at least 50% by weight, preferably in the range from 50% to 80% by weight, based on the overall polymer gel, of water, where the polymer and the water form a homogeneous phase.

A polymer gel in the context of the present invention particularly is understood to mean a composition comprising a polymer and in the range from 50% to 80% by weight, based on the overall polymer gel, of water, where the polymer and the water form a homogeneous phase.

The composition produced with the aid of the process of the invention may, according to the presence and nature of the optional drying step d), comprise 1% to 80% by weight, preferably 5% to 50% by weight, of water and optionally one of the homogeneously water-miscible solvents described below.

In one embodiment of the invention, the composition produced with the aid of the process of the invention may be a dried polymer composition, for example in the form of powder or pellets, comprising (preferably consisting of) the following components:
70% to 99.8% by weight, preferably 83% to 98.8% by weight, more preferably 87% to 94.5% by weight, based on the overall composition, of an acrylamide polymer P described hereinafter;

0.1 to 10% by weight, preferably 0.2 to 2% by weight, more preferably 0.25 to 1% by weight, based on the overall composition, of at least one stabilizer St described hereinafter; and 0.1% to 20% by weight, preferably 1% to 15% by weight, more preferably 5% to 12% by weight, based on the overall composition, of water.

In one embodiment of the invention, the composition produced with the aid of the process of the invention may be a polymer gel or a partly dried polymer gel comprising (preferably consisting of) the following components:

20% to 70% by weight, preferably 30% to 50% by weight, more preferably 30% to 40% by weight, based on the overall composition, an acrylamide polymer P described hereinafter;

0.1 to 10% by weight, preferably 0.2 to 2% by weight, more preferably 0.25 to 1% by weight, based on the overall composition, at least one stabilizer St described hereinafter; and 29.9% to 79.9% by weight, preferably 48.8% to 69.8% by weight, more preferably 55.5% to 69.5% by weight, based on the overall composition, of water.

The composition may, as well as the stabilizer St, typically comprise one or more further additives, for example selected from initiators, separating agents or further standard additives. Typically, the further additives, if present, are present in an amount of 0.01 to 150 000 ppm.

Acrylamide polymer P and monomers in the monomer solution MS

An acrylamide polymer in the context of the present invention is a polymer (homopolymer or copolymer) comprising at least one (meth)acrylamide monomer. In the context of the present application, the notation "(meth)acrylamide" is to encompass acrylamide and/or methacrylamide. More particularly, "acrylamide polymer" or "acrylamide polymer P" in the context of the present invention refers to a polymer comprising at least 10% by weight, preferably at least 15% by weight and especially preferably more than 45% by weight of (meth)acrylamide, based on the total amount of all the monomers in the acrylamide polymer P. In the context of the present invention, a polymer comprising a monomer is understood to mean a polymer comprising a monomer unit (in polymerized form in the polymer chain) based on said monomer. The person skilled in the art will be aware that this wording in the context of the invention does not describe a proportion of unreacted residual monomer.

In one embodiment of the invention, the acrylamide polymer P prepared may be a homopolymer consisting essentially of (meth)acrylamide.

In addition, the acrylamide polymer P used may be a copolymer comprising (or consisting of) (meth)acrylamide and at least one further monomer. More particularly, the acrylamide polymer P is a copolymer which, as well as (meth)acrylamide, comprises an anionic monomer (acidic monomer) as a further monomer, especially selected from acrylic acid, vinylsulfonic acid, acrylamidomethylpropanesulfonic acid and the respective salts. Further monomers used may also be dimethylacrylamide or monomers comprising cationic groups.

In a preferred embodiment, the acrylamide polymer P is a copolymer comprising (meth)acrylamide and at least one anionic, monoethylenically unsaturated, hydrophilic monomer (monomer (b)). More particularly, the acrylamide polymer P is a copolymer comprising (meth)acrylamide and at least one monoethylenically unsaturated, hydrophilic monomer (b). Preferably, the acrylamide copolymer P comprises (meth)acrylamide and at least one anionic, monoethylenically unsaturated, hydrophilic monomers (b2) comprising at least one acidic group selected from —COOH, —SO$_3$H and —PO$_3$H$_2$ and salts thereof. Especially preferably, the acrylamide polymer P is a copolymer comprising (or consisting essentially of) (meth)acrylamide and acrylic acid, ATBS (2-acrylamido-2-methylpropane-1-sulfonic acid, H$_2$C=CH—CO—NH—C(CH$_3$)$_2$—CH$_2$—SO$_3$H) and/or the respective salts.

The term "hydrophilic monomer" in the context of this invention means that the corresponding monomers, for example the monomers (b) described hereinafter, should be soluble in the aqueous solution to be used for polymerization, i.e. an aqueous solution comprising 20% to 45% by weight of monomers, at the desired use concentration. It is thus not absolutely necessary for hydrophilic monomers to be used to be miscible with water with no gap; instead, it is sufficient when they satisfy the minimum requirements mentioned. In general, the solubility of the hydrophilic monomers at room temperature should be at least 50 g/L, preferably at least 100 g/L and more preferably at least 150 g/L.

In a preferred embodiment, the acrylamide polymer P of the composition which is obtained by the process of the invention has a weight-average molecular weight Mw of at least $1*10^6$ g/mol, preferably from $1*10^6$ g/mol to $30*10^6$ g/mol, typically about $10\text{-}20*10^6$ g/mol.

Preferably, the acrylamide polymer P of the composition which is obtained by the process of the invention has an anionicity in the range from 10% to 60%, preferably from 20% to 40%, more preferably from 20% to 35%. Anionicity is understood to mean the molar proportion of the monomers comprising acidic groups based on the total amount of acrylamide polymer P.

The process of the invention comprises, in step a), the providing of an aqueous monomer solution MS comprising 20% to 45% by weight, based on the total amount of all the components of the aqueous monomer solution MS, of at least one ethylenically unsaturated monomer, at least one monomer being (meth)acrylamide.

Preferably, the monomer solution MS may comprise, as well as (meth)acrylamide, at least one of the following monomers:

(a) at least one monoethylenically unsaturated, hydrophobically associating monomer (monomer (a));

(b) at least one monoethylenically unsaturated, hydrophilic monomer (monomer (b)); selected from (b1) uncharged, monoethylenically unsaturated, hydrophilic monomers (b1), especially selected from the group of N-methyl(meth)acrylamide, N,N'-dimethyl(meth)acrylamide or N-methylol(meth)acrylamide;

(b2) anionic, monoethylenically unsaturated, hydrophilic monomers (b2), preferably comprising at least one acidic group selected from —COOH, —SO$_3$H and —PO$_3$H$_2$ or salts thereof;

(b3) cationic, monoethylenically unsaturated, hydrophilic monomers (b3), preferably comprising ammonium groups; for example ammonium derivatives of N-(ω-aminoalkyl)(meth)acrylamides or ω-aminoalkyl (meth)acrylates, e.g. 3-trimethylammoniopropylacrylamide chloride (DIMAPAQUAT), 2-trimethylammonioethyl methacrylate chloride (MADAME-QUAT) and quaternized dimethylaminoethyl acrylate (H$_2$C=CH—CO—O—CH$_2$CH$_2$N(CH$_3$)$_3^+$Cl), (DMA3Q); and (b4) monoethylenically unsaturated, hydrophilic monomers (b4) preferably comprising hydroxyl and/or ether groups, for example hydroxyethyl (meth)acrylate, hydroxypropyl (meth)acrylate, allyl alcohol, hydroxyvinyl ethyl ether, hydroxyvinyl propyl ether or hydroxyvinyl butyl ether;

(c) at least one monoethylenically unsaturated, hydrophobic monomer (monomer (c)), especially selected from N-alkyl- and N,N'-dialkyl(meth)acrylamides, where the number of carbon atoms in the alkyl radicals together is at least 3, preferably at least 4, for example N-butyl(meth)acrylamide, N-cyclohexyl(meth)acrylamide or N-benzyl(meth)acrylamide.

In a preferred embodiment, the proportion of (meth)acrylamide in the monomer solution MS is at least 10% by weight, preferably at least 15% by weight and especially preferably more than 45% by weight, based on the total amount of all the monomers in the acrylamide polymer P.

In a preferred embodiment, the monomer solution MS comprises the following monomers:
- 30% to 100% by weight, preferably 45 to 75% by weight, of (meth)acrylamide;
- 0% to 70% by weight, preferably 1% to 55% by weight, of at least one anionic, monoethylenically unsaturated, hydrophilic monomer (b2);
- 0% to 70% by weight, preferably 1% to 55% by weight, of at least one cationic, monoethylenically unsaturated, hydrophilic monomer (b3);
- 0% to 15% by weight of at least one monoethylenically unsaturated monomer other than (meth)acrylamide and the monomers (b2) and (b3);
where the amounts are each based on the total amounts of all the monomers in the monomer solution MS. In a preferred embodiment, the sum total of the abovementioned monomers is 100% by weight.

In a preferred embodiment, the monomer solution MS comprises the following monomers:
- 60% to 75% by weight of (meth)acrylamide;
- 25% to 40% by weight of at least one monoethylenically unsaturated, hydrophilic monomer (b) selected from anionic, monoethylenically unsaturated, hydrophilic monomers (b2) and cationic, monoethylenically unsaturated, hydrophilic monomers (b3),
where the amounts are each based on the total amounts of all the monomers in the monomer solution MS. In a preferred embodiment, the sum total of the abovementioned monomers is 100% by weight.

In a preferred embodiment, the monomer solution MS comprises the following monomers:
- 30% to 100% by weight, preferably 30% to 99.7% by weight, of (meth)acrylamide;
- 0% to 15% by weight, preferably 0.1% to 15% by weight, of at least one monoethylenically unsaturated, hydrophobically associating monomer (a);
- 0% to 70% by weight, preferably 0.1% to 50% by weight, especially preferably 10% to 50% by weight, of at least one anionic, monoethylenically unsaturated, hydrophilic monomer (b2);
- 0% to 70% by weight, preferably 0.1% to 50% by weight, especially preferably 10% to 50% by weight, of at least one cationic, monoethylenically unsaturated, hydrophilic monomer (b3);
- 0% to 15% by weight of at least one monoethylenically unsaturated monomer other than (meth)acrylamide and the monomers (a), (b2) and (b3);
where the amounts are each based on the total amount of all the monomers in the copolymer, or in the monomer solution MS, and with the proviso that the sum total of the monomers mentioned is 100% by weight.

The monomers (a), (b1), (b2), (b3), (b4) and (c) are described in detail hereinafter.

The acrylamide polymer P may especially comprise hydrophobically associating acrylamide copolymers as described in WO 2010/133527 and WO 2012/069478. It is additionally also possible to use acrylamide copolymers comprising cationic groups as described in U.S. Pat. No. 7,700,702.

Monomer (a):

The monoethylenically unsaturated, hydrophobically associating monomers (a) (also referred to as amphiphilic monomers (a)) are monoethylenically unsaturated monomers having at least one hydrophilic group and at least one, preferably terminal, hydrophobic group. Monomers of this kind serve to impart hydrophobically associating properties to the acrylamide polymer P or acrylamide copolymer P.

"Hydrophobically associating copolymers" are understood by those skilled in the art to mean water-soluble copolymers which, as well as hydrophilic units (in a sufficient amount to assure water solubility), have pendant or terminal hydrophobic groups. In aqueous solution, the hydrophobic groups can associate with one another. Because of this associative interaction, the viscosity of the aqueous polymer solution increases compared to an equivalent polymer merely having no associative groups.

Suitable monomers (a) especially have the general formula $H_2C=C(R^5)-R^6-R^7$ (IIa) where $R^5$ is H or methyl, $R^6$ is a linking hydrophilic group and $R^7$ is a terminal hydrophobic group. In a further embodiment, the monomer (a) may have the general formula $H_2C=C(R^5)-R^6-R^7-R^8$ (IIb) where $R^5$, $R^6$ and $R^7$ are defined as indicated, and $R^8$ is a hydrophilic group.

The linking hydrophilic group $R^6$ may be a group comprising alkylene oxide units, for example a group comprising 5 to 50 alkylene oxide units, joined to the $H_2C=C(R^5)-$ group in a suitable manner, for example by means of a single bond or a suitable linking group, where at least 70 mol %, preferably at least 90 mol %, of the alkylene oxide units are ethylene oxide units. In addition, it may be a group comprising quaternary ammonium groups.

In one embodiment of the invention, the hydrophobic $R^7$ group comprises aliphatic and/or aromatic, straight-chain or branched $C_{8-40}$ hydrocarbyl radicals $R^{7a}$, preferably $C_{12-32}$ hydrocarbyl radicals. In a further embodiment, the hydrophobic $R^7$ group may be a $R^{7b}$ group comprising alkylene oxide units having at least 3 carbon atoms, preferably at least 4 carbon atoms.

In one embodiment of the invention, the monomers (a) are monomers of the general formula

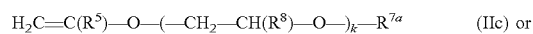

$$H_2C=C(R^5)-O-(-CH_2-CH(R^8)-O-)_k-R^{7a} \quad \text{(IIc) or}$$

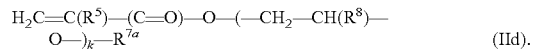

$$H_2C=C(R^5)-(C=O)-O-(-CH_2-CH(R^8)-O-)_k-R^{7a} \quad \text{(IId).}$$

In the formulae (IIc) and (IId), $R^5$ is defined as indicated above, and the $-O-(-CH_2-CH(R^8)-O-)_k-$ and $-(C=O)-O-(-CH_2-CH(R^8)-O-)_k$ groups are specific linking $R^6$ groups, i.e. (IIc) is a vinyl ether and (IId) an acrylic ester.

The number of alkylene oxide units k is a number from 10 to 80, preferably 12 to 60, more preferably 15 to 50 and, for example, 20 to 40. It will be clear to the person skilled in the art in the field of the alkylene oxides that the values mentioned are averages.

The $R^8$ radicals are each independently H, methyl or ethyl, preferably H or methyl, with the proviso that at least 70 mol % of the $R^8$ radicals are H. Preferably at least 80 mol % of the R$^8$ radicals are H, more preferably at least 90 mol %, and they are most preferably exclusively H. Said block is thus a polyoxyethylene block which may optionally also have certain proportions of propylene oxide and/or butylene oxide units, preferably a pure polyoxyethylene block.

R7a is an aliphatic and/or aromatic, straight-chain or branched hydrocarbyl radical having 8 to 40 carbon atoms, preferably 12 to 32 carbon atoms. In one embodiment, it comprises aliphatic hydrocarbyl groups having 8 to 22, preferably 12 to 18 carbon atoms. Examples of such groups include n-octyl, n-decyl, n-dodecyl, n-tetradecyl, n-hexadecyl or n-octadecyl groups. In a further embodiment, it comprises aromatic groups, especially substituted phenyl radicals, especially distyrylphenyl groups and/or tristyrylphenyl groups.

In a further embodiment of the invention, the monomers (a) are monomers of the general formula

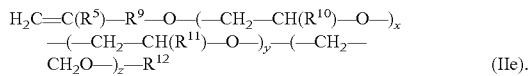

$$H_2C=C(R^5)-R^9-O-(-CH_2-CH(R^{10})-O-)_x$$
$$-(-CH_2-CH(R^{11})-O-)_y-(-CH_2-$$
$$CH_2O-)_z-R^{12} \qquad (IIe).$$

In the monomers (a) of the formula (IIe), an ethylenic group $H_2C=C(R^5)$— is bonded by a divalent linking —$R^9$—O— group to a polyoxyalkylene radical having block structure, where the —(—$CH_2$—$CH(R_{10})$—O—)$_x$—, —($CH_2$—$CH_2$—$CH(R_{11})$—O—)$_y$ and optionally —(—$CH_2$—$CH_2O$—)$_z$—$R^{12}$ blocks are arranged in the sequence shown in formula (IIe). The transition between the two blocks may be abrupt or else continuous.

In formula (IIe), R$^5$ is as already defined, i.e. R$^5$ is H or a methyl group.

R$^9$ is a single bond or a divalent linking group selected from the group consisting of —($C_nH_{2n}$)—[R$^{9a}$ group], —O—($C_{n'}H_{2n'}$)—[R$^{9b}$ group] and —C(O)—O—($C_{n''}H_{2n''}$)—[R$^{9c}$ group]. In each of said formulae, n is a natural number from 1 to 6, n' and n'' are each a natural number from 2 to 6. In other words, the linking group comprises straight-chain or branched aliphatic hydrocarbyl groups having 1 to 6 carbon atoms, linked to the ethylenic $H_2C=C(R^5)$— group directly, via an ether group —O— or via an ester group —C(O)—O—. Preferably, the —($C_nH_{2n}$)—, —($C_{n'}H_{2n'}$)— and —($C_{n''}H_{2n''}$)— groups are linear aliphatic hydrocarbyl groups.

Preferably, the R$^{9a}$ group is a group selected from —$CH_2$—, —$CH_2$—$CH_2$— and —$CH_2$—$CH_2$—$CH_2$—, more preferably a methylene group —$CH_2$—.

Preferably, the R$^{9b}$ group is a group selected from —O—$CH_2$—$CH_2$—, —O—$CH_2$—$CH_2$—$CH_2$— and —O—$CH_2$—$CH_2$—$CH_2$—$CH_2$—, more preferably —O—$CH_2$—$CH_2$—$CH_2$—$CH_2$—.

Preferably, the R$^{9c}$ group is a group selected from —C(O)—O—$CH_2$—$CH_2$—, —C(O)O—$CH(CH_3)$—$CH_2$—, —C(O)O—$CH_2$—$CH(CH_3)$—, —C(O)O—$CH_2$—$CH_2$—$CH_2$— and —C(O)O—$CH_2$—$CH_2$—$CH_2$—$CH_2$—$CH_2$—$CH_2$—$CH_2$, more preferably —C(O)—O—$CH_2$—$CH_2$— and —C(O)O—$CH_2$—$CH_2$—$CH_2$—$CH_2$— and most preferably —C(O)—O—$CH_2$—$CH_2$—.

More preferably, the R$^9$ group is an R$^{9b}$ group, most preferably —O—$CH_2$—$CH_2$—$CH_2$—$CH_2$—.

In the —(—$CH_2$—$CH(R^{10})$—O—)$_x$ block, the R$^{10}$ radicals are each independently H, methyl or ethyl, preferably H or methyl, with the proviso that at least 70 mol % of the R$^{10}$ radicals are H. Preferably, at least 80 mol % of the R$^{10}$ radicals are H, more preferably at least 90 mol %, and they are most preferably exclusively H. Said block is thus a polyoxyethylene block which may optionally also have certain proportions of propylene oxide and/or butylene oxide units, preferably a pure polyoxyethylene block.

The number of alkylene oxide units x is a number from 10 to 50, preferably 12 to 40, more preferably 15 to 35, even more preferably 20 to 30 and, for example, about 22 to 25. It will be clear to the person skilled in the art in the field of the polyalkylene oxides that the numbers mentioned are averages of distributions.

In the second block -(—$CH_2$—$CH(R^{11})$—O—)$_y$—, the R$^{11}$ radicals are each independently hydrocarbyl radicals of at least 2 carbon atoms, for example 2 to 10 carbon atoms, preferably 2 or 3 carbon atoms. This may be an aliphatic and/or aromatic, linear or branched hydrocarbyl radical. Preference is given to aliphatic radicals.

Examples of suitable R$^{11}$ radicals include ethyl, n-propyl, n-butyl, n-pentyl, n-hexyl, n-heptyl, n-octyl, n-nonyl or n-decyl, and also phenyl. Examples of preferred radicals include ethyl, n-propyl, n-butyl, n-pentyl and particular preference is given to ethyl and/or n-propyl radicals. The —(—$CH_2$—$CH(R^{11})$—O—)$_y$— block is thus a block consisting of alkylene oxide units having at least 4 carbon atoms.

The number of alkylene oxide units y is a number from 5 to 30, preferably 8 to 25.

In formula (IIe), z is a number from 0 to 5, for example 1 to 4, i.e. the terminal block of ethylene oxide units is thus merely optionally present. In a preferred embodiment of the invention, a mixture of at least two monomers (a) of the formula (IIe) may be used, in which case the R$^5$, R$^9$, R$^{10}$, R$^{11}$, R$^{12}$ radicals and the indices x and y are the same in each case; only in one of the monomers is z=0 while z>0 in the other, preferably 1 to 4.

The R$^{12}$ radical is H or a preferably aliphatic hydrocarbyl radical having 1 to 30 carbon atoms, preferably 1 to 10 and more preferably 1 to 5 carbon atoms. Preferably, R$^{12}$ is H, methyl or ethyl, more preferably H or methyl and most preferably H.

The hydrophobically associating monomers (a) of the formulae (IIc), (IId) and (IIe), acrylamide copolymers comprising these monomers and the preparation thereof are known in principle to those skilled in the art, for example from WO 2010/133527 and WO 2012/069478.

In a further embodiment, the associative monomer (a) is a cationic monomer of the general formula $H_2C=C(R^5)$—C(=O)O—R$^{13}$N$^+$(R$^{14}$)(R$^{15}$)(R$^{16}$) X$^-$(IIf) or $H_2C=C$(R$^5$)—C(=O)N(R$^{17}$)—R$^{13}$—N$^+$(R$^{14}$)(R$^{15}$)(R$^{16}$) X$^-$(IIg).

In the formulae (IIf) and (IIg), R$^5$ is as defined above.

R$^{13}$ is an alkylene radical, especially a 1,ω-alkylene radical having 1 to 8 carbon atoms, preferably 2 to 4 carbon atoms and especially 2 or 3 carbon atoms. Examples include-$CH_2$—, —$CH_2CH_2CH_2$—, —$CH_2CH_2CH_2$— and —$CH_2CH_2CH_2CH_2$—. Particular preference is given to —$CH_2CH_2$— and —$CH_2CH_2CH_2$—.

R$^{13}$, R$^{14}$ and R$^{15}$ are each independently H or an alkyl group having 1 to 4 carbon atoms, preferably H or methyl. R$^{13}$ is preferably H and R$^{14}$ and R$^{15}$ are preferably each methyl. X$^-$ is a negatively charged counterion, especially a halide ion selected from F$^-$, Cl$^-$, Br$^-$ or I$^-$, preferably Cl$^-$ and/or Br$^-$.

R$^{16}$ is an aliphatic and/or aromatic, linear or branched hydrocarbyl group having 8 to 30 carbon atoms, preferably 12 to 18 carbon atoms. R$^{16}$ may especially comprise aliphatic hydrocarbyl radicals having 8 to 18, preferably 12 to 18, carbon atoms. Examples of such groups include n-octyl, n-decyl, n-dodecyl, n-tetradecyl, n-hexadecyl or n-octadecyl groups, preferably n-dodecyl, n-tetradecyl, n-hexadecyl or n-octadecyl groups.

Preference is given to a monomer of the general formula (IIg). Examples of such monomers comprise N-(meth)acrylamidopropyl-N,N-dimethyl-N-dodecylammonium chloride, N-(meth)acrylamidopropyl-N,N-dimethyl-N-tetradecylammonium chloride, N-(meth)acrylamidopropyl-N,N-dimethyl-N-hexadecylammonium chloride or N-(meth)acrylamidopropyl-N,N-dimethyl-N-octadecylammonium chloride or the corresponding bromides. Monomers of this kind and acrylamide copolymers having such monomers are known and are described, for example, in U.S. Pat. No. 7,700,702 B2.

Further preferably, the acrylamide polymer P may be a copolymer as described in WO 2012/069478. Preferably, the monomer solution MS, comprises, as monomers:
  (a) 0.1% to 15% by weight of at least one monoethylenically unsaturated, hydrophobically associating monomer (a), and
  (b) 85% to 99.9% by weight of at least two different monoethylenically unsaturated, hydrophilic monomers (b), where the monomers (b) are at least
    (b1) at least one uncharged, monoethylenically unsaturated, hydrophilic monomer (b1) selected from the group of (meth)acrylamide, N-methyl(meth)acrylamide, N,N'-dimethyl(meth)acrylamide and N-methylol(meth)acrylamide, with the proviso that at least 10% by weight, preferably at least 15% by weight and especially preferably more than 45% by weight, based on the total amount of all the monomers in the acrylamide polymer P, of (meth)acrylamide is present;
    (b2) at least one anionic, monoethylenically unsaturated, hydrophilic monomer (b2) which trades at least one acidic group selected from the group of —COOH, —SO$_3$H and —PO$_3$H$_2$ or salts thereof,
where the figures stated, unless stated otherwise, are each based on the total amount of all the monomers in the copolymer, or in the monomer solution MS.

Monomers (b):

The acrylamide copolymer or the monomer solution MS may preferably comprise at least one monoethylenically unsaturated, hydrophilic monomer (b), with the proviso that at least 10% by weight, preferably at least 15% by weight and especially preferably more than 45% by weight of (meth)acrylamide, based on the total amount of all the monomers in the acrylamide polymer P or in the monomer solution MS, is present.

Preferably, the hydrophilic monomers (b) have functional groups selected from the group consisting of carbonyl groups >C=O, ether groups —O—, especially polyethylene oxide groups —(CH$_2$—CH$_2$—O—)$_n$— where n is preferably a number from 1 to 200, hydroxyl groups —OH, primary, secondary or tertiary amino groups, ammonium groups, amide groups —C(O)—NH—, carboxamide groups —C(O)—NH$_2$ or acidic groups such as carboxyl groups —COOH, sulfo groups —SO$_3$H, phosphonic acid groups —PO$_3$H$_2$ or phosphoric acid groups —OP(OH)$_3$. Examples of preferred functional groups comprise hydroxyl groups —OH, carboxyl groups —COOH, sulfo groups —SO$_3$H, carboxamide groups —C(O)—NH$_2$, amide groups —C(O)—NH— and polyethylene oxide groups —(CH$_2$—CH$_2$—O—)$_n$—H where n is preferably a number from 1 to 200.

The functional groups may be attached directly to the ethylenic group, or else are bonded via one or more linking hydrocarbyl groups to the ethylenic group.

More preferably, the monoethylenically unsaturated hydrophilic monomers (b) used are miscible with water in any ratio. However, it is sufficient for execution of the invention that the monomers (b) are soluble in the monomer solution MS used for polymerization at the desire use concentration. In general, the solubility of the monomers (b) in water at room temperature should be at least 50 g/l, preferably at least 100 g/l and more preferably at least 150 g/l.

The amount of all the hydrophilic monomers (b) in the acrylamide polymer P or in the monomer solution MS is typically 85% to 99.9% by weight based on the total amount of all the monomers in the acrylamide polymer P, preferably 90% to 99.8% by weight, with the proviso that at least 10% by weight, preferably at least 15% by weight and especially preferably more than 45% by weight of (meth)acrylamide, based on the total amount of all the monomers in the acrylamide polymer P, is present.

The amount of the uncharged, hydrophilic monomers (b1) here is generally 10 to 95% by weight, preferably 30 to 95% by weight, preferably 30 to 85% by weight and more preferably 30 to 70% by weight, based on the total amount of all the monomers used, with the proviso that at least 10% by weight, preferably at least 15% by weight and especially preferably more than 45% by weight of (meth)acrylamide, based on the total amount of all the monomers in the acrylamide polymer P, is present.

If the acrylamide copolymer P comprises only uncharged monomers (b1) and anionic monomers (b2), it has been found to be useful to use the uncharged monomers (b1) including (meth)acrylamide in an amount of 30 to 95% by weight and the anionic monomers (b2) in an amount of 4.9 to 69.9% by weight, the amount being based in each case on the total amount of all the monomers used. In this embodiment, the monomers (b1) are preferably used in an amount of 30 to 80% by weight and the anionic monomers (b2) in an amount of 19.9 to 69.9% by weight, and the monomers (b1) are more preferably used in an amount of 40 to 70% by weight and the anionic monomers (b2) in an amount of 29.9 to 59.9% by weight.

If the copolymer comprises uncharged monomers (b1), anionic monomers (b2) and cationic monomers (b3), it has been found to be useful to use the uncharged monomers (b1) including (meth)acrylamide in an amount of 30 to 95% by weight and the anionic (b2) and cationic monomers (b3) together in an amount of 4.9 to 69.9% by weight, with the proviso that the molar ratio (b2)/(b3) is 0.7 to 1.3. Preferably, the molar ratio (b2)/(b3) is 0.8 to 1.2 and, for example, 0.9 to 1.1. This measure makes it possible to obtain copolymers which are particularly insensitive to salt burden. In this embodiment, the monomers (b1) are preferably used in an amount of 30 to 80% by weight and the anionic and cationic monomers (b2)+(b3) together in an amount of 19.9 to 69.9% by weight, and the monomers (b1) are more preferably used in an amount of 40 to 70% by weight and the anionic and cationic monomers (b2)+(b3) together in an amount of 29.9 to 59.9% by weight, and the molar ratio already mentioned should be complied with in each case.

Monomers (b1):

The monomer solution MS may typically comprise, as well as (meth)acrylamide, at least one other uncharged, monoethylenically unsaturated, hydrophilic monomer (b1) selected from the group of N-methyl(meth)acrylamide, N,N'-dimethyl(meth)acrylamide or N-methylol(meth)-acrylamide, with the proviso that at least 10% by weight, preferably at least 15% by weight and especially preferably more than 45% by weight of (meth)acrylamide, based on the total amount of all the monomers in the acrylamide polymer P, is present.

It is additionally possible to use, as monomer (b1), exclusively (meth)acrylamide, especially acrylamide.

Monomers (b2):

In a preferred embodiment, the monomer solution MS comprises, as well as (meth)acrylamide, additionally at least one hydrophilic, monoethylenically unsaturated anionic monomer (b2) comprising at least one acidic group selected from the group of —COOH, —SO$_3$H and —PO$_3$H$_2$ or salts thereof. Preference is given to monomers comprising —COOH groups and/or —SO$_3$H groups, particular preference to monomers comprising —SO$_3$H groups. It will be appreciated that the salts of the acidic monomers may also be involved. Suitable counterions comprise especially alkali metal ions such as Li$^+$, Na$^+$ or K$^+$, and also ammonium ions such as NH$_4^+$ or ammonium ions having organic radicals.

Examples of monomers comprising COOH groups include acrylic acid, methacrylic acid, crotonic acid, itaconic acid, maleic acid or fumaric acid. Preference is given to acrylic acid and/or salts thereof, especially sodium acrylate.

Examples of monomers (b2) comprising sulfo groups include vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methyl-butanesulfonic acid or 2-acrylamido-2,4,4-trimethylpentanesulfonic acid. Preference is given to vinylsulfonic acid, allylsulfonic acid or 2-acrylamido-2-methylpropanesulfonic acid and particular preference to 2-acrylamido-2-methylpropanesulfonic acid (ATBS) or salts thereof.

Examples of monomers (b2) comprising phosphonic acid groups include vinylphosphonic acid, allylphosphonic acid, N-(meth)acrylamidoalkylphosphonic acids or (meth)acryloyloxyalkyl-phosphonic acids, preferably vinylphosphonic acid.

Preferably, monomer (b2) may be selected from the group consisting of acrylic acid, methacrylic acid, crotonic acid, itaconic acid, maleic acid, fumaric acid, vinylsulfonic acid, allylsulfonic acid, 2-acrylamido-2-methylpropanesulfonic acid (ATBS), 2-methacrylamido-2-methylpropane-sulfonic acid, 2-acrylamidobutanesulfonic acid, 3-acrylamido-3-methylbutanesulfonic acid, 2-acrylamido-2,4,4-trimethylpentanesulfonic acid, vinylphosphonic acid, allylphosphonic acid, N-(meth)acrylamidoalkylphosphonic acids and (meth)acryloyloxyalkylphosphonic acids, more preferably from acrylic acid and/or ATBS or salts thereof.

Further preferably, the monomer solution MS comprises, as monomers, (meth)acrylamide and at least two further monomers (b2) comprising different acidic groups. More particularly, the monomers (b2) comprising acidic groups are a monomer comprising the —SO$_3$H group (e.g. 2-acrylamido-2-methylpropanesulfonic acid (ATBS)) and a monomer comprising the —COOH group (e.g. acrylic acid).

Especially preferably, the monomer solution MS comprises at least one monomer selected from the group consisting of (meth)acrylamide, 2-acrylamido-2-methylpropanesulfonic acid (ATBS), acrylic acid and the respective salts thereof, with the proviso that at least 10% by weight, preferably at least 15% by weight and especially preferably more than 45% by weight of (meth)acrylamide, based on the total amount of all the monomers in the acrylamide polymer P, is present. Especially preferably, the monomer solution MS comprises (meth)acrylamide, 2-acrylamido-2-methylpropanesulfonic acid (ATBS), acrylic acid and/or the respective salts thereof.

For the sake of completeness, it should be mentioned that the monomers (b1) can under some circumstances be hydrolyzed at least partly to (meth)acrylic acid in the course of preparation and use. The acrylamide copolymers prepared in accordance with the invention may accordingly comprise (meth)acrylic acid units even if no (meth)acrylic acid units at all have been used for the synthesis. The tendency of the monomers (b1) to be hydrolyzed increases with increasing content of sulfo groups. Accordingly, the presence of sulfo groups in the acrylamide copolymer used is advisable.

Monomers (b3):

The monomer solution MS may optionally comprise, as well as (meth)acrylamide, at least one monoethylenically unsaturated, cationic monomer (b3) having ammonium groups.

Suitable cationic monomers (b3) comprise especially monomers having ammonium groups, especially ammonium derivatives of N-(ω-aminoalkyl)(meth)acrylamides or ω-aminoalkyl (meth)acrylates.

More particularly, monomers (b3) having ammonium groups may be compounds of the general formulae H$_2$C=C(R$^{8P}$)—CO—NR$^{9P}$—R$^{10P}$—N(R$^{11P}$)$_3^+$ M$^-$ (Va) and/or H$_2$C=C(R$^{8P}$)—COO—R$^{10P}$—N(R$^{11P}$)$_3^+$X$^-$ (Vb). In these formulae, R$^{8P}$ is H or methyl, R$^{9P}$ is H or a C$_1$- to C$_4$-alkyl group, preferably H or methyl and R$^{10P}$ is a preferably linear C$_1$- to C$_4$-alkylene group, for example a 1,2-ethylene group —CH$_2$—CH$_2$— or a 1,3-propylene group —CH$_2$—CH$_2$—CH$_2$—.

The R$^{11P}$ radicals are each independently C$_1$- to C$_4$-alkyl radicals, preferably methyl or a group of the general formula —R$^{12P}$—SO$_3$H where R$^{12P}$ is a preferably linear C$_1$- to C$_4$-alkylene group or a phenyl group, with the proviso that generally not more than one of the R$^{11P}$ substituents is a substituent having sulfo groups. More preferably, the three R$^{11P}$ substituents are methyl groups, meaning that the monomer has an —N(CH$_3$)$_3^+$ group. M$^-$ in the above formula is a monovalent anion, for example Cl$^-$. It will be appreciated that M$^-$ may also be a corresponding fraction of a polyvalent anion, although this is not preferred. Examples of preferred monomers (b3) of the general formula (Va) or (Vb) comprise salts of 3-trimethylammoniopropyl(meth)acrylamides or 2-trimethylammonioethyl (meth)acrylates, for example the corresponding chlorides such as 3-trimethylammoniopropylacrylamide chloride (DIMAPAQUAT) and 2-trimethylammonioethyl methacrylate chloride (MADAME-QUAT).

In a preferred embodiment, the monomer solution MS comprises at least one (meth)acrylamide and at least one cationically modified polyacrylamide, especially DMA3Q, quaternized dimethylaminoethyl acrylate, (H$_2$C=CH—CO—O—CH$_2$CH$_2$N(CH$_3$)$_3^+$Cl), generally —N(CH$_3$)$_2$—R (R=long-chain alkyl).

Monomers (b4)

The monomer solution MS may additionally comprise further monoethylenically unsaturated, hydrophilic monomers (b4) other than the hydrophilic monomers (b1), (b2) and (b3). Examples of such monomers include monomers comprising hydroxyl and/or ether groups, for example hydroxyethyl (meth)acrylate, hydroxypropyl (meth)acrylate, allyl alcohol, hydroxyvinyl ethyl ether, hydroxyvinyl propyl ether, hydroxyvinyl butyl ether or compounds of the formula H$_2$C=C(R$^{1P}$)—COO—(—CH$_2$—CH(R$^{13P}$)—O—)$_b$—R$^{14P}$ (VIa) or H$_2$C=C(R$^{1P}$)—O—(—CH$_2$—CH(R$^{13P}$)—O—)$_b$—R$^{14P}$ (VIb) where R$^{1P}$ is H or a methyl group and b is a number from 2 to 200, preferably 2 to 100. The R$^{13P}$ radicals are each independently H, methyl or ethyl, preferably H or methyl, with the proviso that at least 50 mol % of the R$^{13P}$ radicals are H. Preferably at least 75 mol % of the R$^{13P}$ radicals are H, more preferably at least 90 mol %, and they are most preferably exclusively H. The R$^{14P}$ radical is H, methyl or ethyl, preferably H or methyl. Further examples of monomers (b4) include N-vinyl derivatives, for example N-vinylformamide, N-vinylacetamide, N-vinylpyrrolidone or N-vinylcaprolactam, and also vinyl esters, for example vinyl formate or vinyl acetate. N-Vinyl derivatives can be hydrolyzed after polymerization to vinylamine units, and vinyl esters to vinyl alcohol units.

Monomers (c)

As well as the above-described monomers, the monomer solution MS may comprise further monoethylenically unsaturated monomers (c). It will be appreciated that it is also possible for mixtures of a plurality of different monomers (c) to be present.

Such monomers can be used for fine control of the properties of the acrylamide polymer P. If they are present at all, the amount of such optional monomers (c) may be up to 14.9% by weight, preferably up to 9.9% by weight, more preferably up to 4.9% by weight, based in each case on the total amount of all the monomers. Most preferably, no monomers (c) are present.

The monomers (c) may, for example, be monoethylenically unsaturated monomers which have a more hydrophobic character than the hydrophilic monomers (b) and which are accordingly only slightly water-soluble. In general, the solubility of the monomers (c) in water at room temperature is less than 50 g/l, especially less than 30 g/l. Examples of such monomers include N-alkyl- and N,N'-dialkyl(meth)acrylamides, where the number of carbon atoms in the alkyl radicals together together is at least 3, preferably at least 4. Examples of such monomers include N-butyl(meth)acrylamide, N-cyclohexyl(meth)acrylamide or N-benzyl(meth)acrylamide.

Step a)

The process of the invention comprises, in step a), the providing of a monomer solution MS comprising (meth)acrylamide and optionally further monomers (a), (b) and/or (c) described below, at least one initiator I, preferably a thermal initiator, for free-radical polymerization and at least one solvent So.

The monomer solution MS has a concentration of monomers in the range from 20% to 45% by weight, preferably 25% to 40% by weight, more preferably 30% to 40% by weight, based on the overall monomer solution MS. According to the invention, the monomer solution MS comprises, as monomer, (meth)acrylamide and optionally one or more of the monomers (a), (b) and/or (c) described, preferably one or more of the monomers (a) and (b), especially preferably one or more of the monomers (b1), (b2) and (b3) described.

Preferably, the monomer solution MS comprises 2% to 39.5% by weight, based on the overall monomer solution MS, of (meth)acrylamide and 0.5% to 23% by weight, based on the overall monomer solution MS, of one or more of the monomers (a) and (b) described.

Suitable compositions and quantitative ratios in the monomer solutions MS have already been described in detail above, and explicit reference is made thereto at this point.

Acidic or basic monomers may be fully or partly neutralized prior to the polymerization. Preferably, the pH of the monomer solution MS is in the range from 4 to 9, preferably in the range from 5 to 8.

Preferably, the above-described monomer solution MS comprises at least one standard initiator I for free-radical polymerization, especially selected from peroxide initiators, azo initiators and redox initiators. Particular preference is given to using an azo initiator, especially at least one azo initiator selected from 4,4'-azobis(4-cyanovaleric acid) (ACVA), azobis(isobutyronitrile) (AIBN), dibenzoyl peroxide (DBPO) and 2,2'-azobis(2-methylpropionamidine) dihydrochloride.

Further preferably, the initiator I used is a combination of at least one azo initiator and at least one redox initiator.

Typical peroxide initiators are, for example, dibenzoyl peroxide (DBPO), cyclohexylsulfonylacetyl peroxide (SPO), diisopropyl peroxydicarbonate (DIPP), butyl peroxypivalate, dilauryl peroxide (DLPO), tert-butyl hydroperoxide (t-BHP) and cumene hydroperoxide. Typical azo initiators are, for example, 4,4'-azobis-4-cyanovaleric acid (ACVA), 2,2'-azobis(2-methylpropionamidine) dihydrochloride, 2,2'-azobis(2-methylpropionitrile), 2,2'-azobis(2-methylbutanenitrile), 2,2'-azobis(2,4-dimethylvaleronitrile), 1,1'-azobis(cyanocyclo-hexane), 1,1'-azobis(N,N-dimethylformamide), 2,2'-azobis(2-methylbutyronitrile), 2,2'-azobis(4-methoxy-2,4-dimethylvaleronitrile), 2,2'-azobis(2,4,4-trimethylpentane). Typical redox initiators are, for example, mixtures of an oxidizing agent, such as hydroperoxide, peroxodisulfates or the abovementioned peroxide compounds, and a reducing agent, such as iron(II) salts, silver(I) salts, cobalt(II) salts, sulfites, hydrogensulfites or thiosulfates.

Preferably, the monomer solution MS comprises 300 to 1000 ppm, preferably 600 to 800 ppm, based on the overall monomer solution MS, of at least one initiator, especially selected from 4,4'-azobis(4-cyanovaleric acid) (ACVA), azobis(isobutyronitrile) (AIBN), dibenzoyl peroxide (DBPO), 2,2'-azobis(2-methylpropionamidine) dihydrochloride and tert-butyl hydroperoxide (t-BHP), more preferably 4,4'-azobis(4-cyanovaleric acid) (ACVA), azobis(isobutyronitrile) (AIBN) and 2,2'-azobis(2-methylpropionamidine) dihydrochloride.

Preferably, the monomer solution MS comprises, as redox initiator, 1 to 50 ppm, based on the overall monomer solution MS, of at least one oxidizing agent, preferably an abovementioned peroxide compound, for example tert-butyl hydroperoxide (t-BHP), and 1 to 50 ppm, based on the overall monomer solution MS, of at least one reducing agent, preferably an abovementioned sulfite.

Preferably, the monomer solution MS comprises, as initiator I, a combination of an azo initiator and a redox initiator in the above-described amount ranges.

In the context of the present invention, ppm means mg/kg.

As solvent So, the monomer solution MS preferably comprises water, or a mixture of water and one or more water-miscible organic solvents, where the proportion of water is generally at least 85% by weight, preferably at least 95% by weight, more preferably at least 98% by weight, based in each case on the sum total of all the solvents So. Organic solvents used may be known polar water-miscible solvents, such as alcohols or dimethyl sulfoxide (DMSO). Organic solvents used may especially be water-miscible alcohols such as methanol, ethanol or propanol. In a preferred embodiment, the solvent So used is exclusively water.

Preference is given to using a monomer solution MS comprising 20% to 45% by weight, preferably 25% to 40% by weight, more preferably 30% to 40% by weight, based on the overall monomer solution MS, of monomers, especially selected from (meth)acrylamide and the optional monomers (a) to (c) described, preferably (a) and (b), especially preferably (b1), (b2) and/or (b3), with the proviso that at least 10% by weight, preferably at least 15% by weight and especially preferably more than 45% by weight, based on the total amount of all the monomers, is (meth)acrylamide, 1 to 1000 ppm of an abovementioned free-radical initiator I and at least one solvent So, preferably water, where all the figures are based on the overall monomer solution MS. In a preferred embodiment, the amounts of (meth)acrylamide monomer, optional further monomers (a), (b) and/or (c), initiator I and solvent So add up to 100% by weight.
Step b)

The process of the invention comprises, in step b), the polymerizing of the monomer solution MS to give the acrylamide polymer P in the form of a polymer gel.

The polymerizing of the monomer solution MS can be initiated, for example, directly by adding the at least one initiator I for the free-radical polymerization (part of step a)) or by increasing the temperature of the monomer solution MS already comprising the initiator I. The polymerizing of the monomer solution MS can additionally be initiated by irradiation with UV light.

The polymerization of (meth)acrylamide and optionally of the further monomers (a), (b) and/or (c) described below by means of free-radical polymerization in what is called a gel polymerization is described in principle in the prior art. The polymerization in step b) can be effected, for example, as described in WO 2012/069478 and WO 2010/133527.

Preferably, the polymerization in step b) is conducted under adiabatic conditions or at least essentially adiabatic conditions, in which case the monomer solution is heated under the influence of the heat of polymerization formed and a polymer gel is obtained. Preferably, step b) is an adiabatic gel polymerization.

Adiabatic conditions or at least essentially adiabatic conditions are understood by the person skilled in the art to mean that no heat is supplied to the reactor from outside during the polymerization and the reactor is not cooled during the reaction. It will be clear to the person skilled in the art—according to the internal temperature of the reactor and the ambient temperature—that certain amounts of heat can be released and absorbed via the reactor wall because of temperature gradients. This effect normally plays an ever smaller role with increasing reactor size.

Typically, the monomer solution MS is cooled to −5° C. to 50° C., preferably to about 0° C., and then polymerized photochemically and/or thermally. Preferably, the polymerization is effected by adding suitable initiators I for the free-radical polymerization, e.g. peroxides (such as tert-butyl hydroperoxide), azo compounds (such as azobis (isobutyronitrile)) or redox initiators. Preference is given to using a combination of one or more azo compounds and one or more redox initiators. Suitable initiators I have been described above. Photochemical polymerization is typically initiated at temperatures of −5 to 10° C.; thermal polymerization is typically initiated at temperatures of −5 to 50° C. It is also possible to combine photochemical and thermal polymerization with one another. During the polymerization, the temperature generally rises because of the heat of reaction to 60 to 100° C., preferably 80 to 95° C.

Typically, the monomer solution MS or the reaction mixture is not stirred during the polymerization. The gel polymerization can be undertaken, for example, in a tubular reactor as described by GB 1,054,028. Particularly advantageously, the polymerization can be conducted using conical reactors as described, for example, by U.S. Pat. No. 5,633,329 or U.S. Pat. No. 7,619,046.

Further details regarding performance of a gel polymerization are described, for example, in WO 2010/133527 (pages 18 and 19) and DE 10 2004 032 304 A1 (paragraphs [0037] to [0041]).

The polymerization in step b), especially the adiabatic gel polymerization, can typically be effected in a continuous or batchwise process.

In general, the polymer gel obtained in step b) cools down slowly to room temperature after the polymerization. Particularly, the polymer gel obtained in step b) is not kept at a temperature, which is essentially higher than room temperatur, for example 65° C.

In general, the polymer gel obtained in step b) is solid and does not flow out of the polymerization reactor without additional measures. If the polymerization reactor used has mechanical aids, for example a movable ram disposed in the reactor (for example as described in GB 1,054,028), the polymer gel can be expressed using such aids.

The expression of the polymer gel from the polymerization reactor can also be undertaken, for example, using gases. For this purpose, a gas is typically injected at the top of the polymerization reactor. For this purpose, it is possible to use any gases which cannot react with the polymer gel. Advantageously, it is possible for this purpose to inject inert gases, such as nitrogen, carbon dioxide or argon, at the top of the reactor. But it is also possible to use other gases, for example compressed air. Alternatively, an inert liquid, especially a precipitant for the acrylamide polymer P, can be injected at the top of the reactor. The pressure of the gas or liquid is chosen suitably by the person skilled in the art and may, for example, be $2*10^5$ to $65*10^5$ Pa, especially $4*10^5$ to $25*10^5$ Pa. The pressure is especially chosen such that the polymer gel is discharged homogeneously from the reactor. The expression the polymer gel from the polymerization reactor is especially conducted in the case of a batchwise polymerization in step b). It is possible that a first coarse comminution of the polymer gel (optional step e)) is effected after the removal.

In the case of a continuous polymerization in step b), the resultant polymer gel is typically discharged from the polymerization reactor with the aid of a screw (conveying screw).
Step c)

The process of the invention comprises, in step c), the treating of the polymer gel having a water content of at least 30% by weight, preferably of at least 50% by weight, based on the overall polymer gel, with an aqueous solution SS comprising at least one stabilizer St.

Particularly, the process of the invention comprises, in step c), the treating of the polymer gel having a water content in the range from 50% to 80% by weight, based on the overall polymer gel, with an aqueous solution SS comprising at least one stabilizer St.
Stabilizer St According to the invention, the aqueous solution SS comprises at least one stabilizer St selected from the group consisting of sulfur compounds (organic sulfur compounds or inorganic sulfur compounds such as, for example, thiocyanate salts), in particular organic sulfur compounds, N-oxides, organic nitroso compounds, aromatic hydroxyl compounds and ketones.

The stabilizers St are stabilizers which are suitable for preventing polymer degradation by molecular oxygen. More particularly, the stabilizer St is what is called a free-radical scavenger, i.e. compounds which can react with free radicals, such that these reactive oxygen species can no longer attack and hence degrade the polymer. Free radicals may, for example, be reactive oxygen species which are formed by UV light or redox processes. Typically, as described above, in the course of polymer flooding, there is degradation of the polyacrylamide and hence an unwanted drop in the viscosity of the polymer solution in the course of flooding.

Stabilizers of this kind are known in principle to those skilled in the art. For example, they may be sulfur compounds, sterically hindered amines, N-oxides, nitroso compounds, aromatic hydroxyl compounds or ketones.

In the process of the invention, preference is given to using no sterically hindered amines (HALS stabilizers) as stabilizer St, especially preferably no sterically hindered piperidine derivatives, for example 1,2,2,6,6-pentamethyl-4-piperidinol (PMP) are used.

As the stabilizer St, preference is given to sulfur compounds, in particular sulfur compounds selected from thiourea; substituted thioureas such as N,N'-dimethylthiourea, N,N'-diethylthiourea, N,N'-diphenylthiourea; thiocyanates, for example ammonium thiocyanate or potassium thiocyanate; tetramethylthiuram disulfide; mercaptans such as 2-mercaptobenzothiazol or 2-mercaptobenzimidazole or the alkali metal salts thereof (for example the sodium salts), more preferably 2-mercaptobenzothiazol and the alkali salts thereof; sodium dimethyldithiocarbamate; 2,2'-dithiobis(benzothiazole) and 4,4'-thiobis(6-t-butyl-m-cresol).

Preferably, the at least one stabilizer St is an organic sulfur compound. An organic sulfur compound in the context of the present invention is an organic compound having at least one sulfur-containing functional group, especially a group selected from —SCN (thiocyanate group), —NCS (isothiocyanate group); —NR'—C(=S)—NR'— (thiourea group); —NR'—C(=S)—NR'$_2$—S—H (thiol group), —S-M (thiolate group) where M is a metal ion, especially an alkali metal ion, —S—S—R' (disulfide groups), —NR'—C(=O)—S—R' (thiolourethane group), —NR'—C(=S)—O—R' (thionourethane group), —NR'—C(=S)—S—R' (dithiourethane group), where R' is H or an organic hydrocarbyl radical. More particularly, the stabilizer St is an organic sulfur compound selected from thiols, thiophenols, sulfides, disulfides, sulfoxides, thioureas and thiourethanes (thiocarbamates), e.g. thiolourethanes, thionourethane, dithiourethanes.

Further examples of the stabilizer St include dicyandiamide, guanidine, cyanamide, paramethoxyphenol, 2,6-di-t-butyl-4-methylphenol, butylhydroxyanisole, 8-hydroxyquinoline, 2,5-di(t-amyl)hydroquinone, 5-hydroxy-1,4-naphthoquinone, 2,5-di(t-amyl)hydroquinone, dimedone, propyl 3,4,5-trihydroxybenzoate, ammonium N-nitrosophenylhydroxylamine.

In one embodiment, the stabilizer St is at least one compound selected from the group consisting of thiourea; N,N'-dimethylthiourea, N,N'-diethylthiourea, N,N'-diphenylthiourea; thiocyanates, tetramethylthiuram disulfide; 2-mercaptobenzothiazole or salts thereof (especially sodium 2-mercaptobenzothiazole), 2-mercaptobenzimidazole or salts thereof (especially sodium 2-mercaptobenzimidazole); sodium dimethyldithiocarbamate; 2,2'-dithiobis(benzothiazole), 4,4'-thiobis(6-t-butyl-m-cresol), dicyandiamide, guanidine, cyanamide, paramethoxyphenol, 2,6-di-t-butyl-4-methylphenol, butylhydroxyanisole, 8-hydroxychinoline, 2,5-di(t-amyl)hydroquinone, 5-hydroxy-1,4-naphthoquinone, 2,5-di(t-amyl)hydroquinone, dimedone, propyl 3,4,5-trihydroxybenzoate and ammonium N-nitrosophenylhydroxylamine.

In a preferred embodiment, the stabilizer St is at least one compound selected from the group consisting of thiourea; N,N'-dimethylthiourea, N,N'-diethylthiourea, N,N'-diphenylthiourea; thiocyanates, tetramethylthiuram disulfide; 2-mercaptobenzothiazole or salts thereof (especially sodium 2-mercaptobenzothiazole); sodium dimethyldithiocarbamate; 2,2'-dithiobis(benzothiazole), 4,4'-thiobis(6-t-butyl-m-cresol), dicyandiamide, guanidine, cyanamide, 2,6-di-t-butyl-4-methylphenol, butylhydroxyanisole, 8-hydroxychinoline, 2,5-di(t-amyl)hydroquinone, 5-hydroxy-1,4-naphthoquinone, 2,5-di(t-amyl)hydroquinone, propyl 3,4,5-trihydroxybenzoate and ammonium N-nitrosophenylhydroxylamine.

In one embodiment, the invention relates to a process for producing a composition comprising at least one acrylamide polymer P and at least one stabilizer St, where the stabilizer St is at least one mercapto compound, especially a mercapto compound selected from the group consisting of 2-mercaptobenzothiazole, 2-mercaptobenzimidazole and salts thereof (for example sodium salts).

In a preferred embodiment, the invention relates to a process for producing a composition comprising at least one acrylamide polymer P and at least one stabilizer St, where the stabilizer St is at least one mercapto compound, especially a mercapto compound selected from the group consisting of 2-mercaptobenzothiazole and salts thereof (for example sodium salts). More preferably, the stabilizer St is at least one mercapto compound, with the mercapto compound not representing a piperidine derivative, especially not a sterically hindered piperidine derivative.

More preferably, the stabilizer St is 2-mercaptobenzothiazole and/or salts thereof, for example sodium 2-mercaptobenzothiazole (Na-MBT). In a preferred embodiment, at least one, preferably exactly one, mercapto compound, preferably sodium 2-mercaptobenzothiazole (Na-MBT), is used as the sole stabilizer St.

A mercapto compound in the context of the present invention is an organic compound having at least one —S—H (thiol group) and/or —S-M group where M is a metal ion, especially an alkali metal ion.

The stabilizer used is preferably exclusively one or more of the above-described stabilizers St. Alternatively, it is possible to combine the above-described stabilizer St with other known stabilizers, for example sacrificial reagents (such as alcohols).

The acrylamide polymer P is treated in accordance with the invention with the stabilizer St in the form of an aqueous solution SS, preferably using water as solvent, or a mixture of water and one or more suitable water-miscible organic solvents, where the proportion of water is generally at least 85% by weight, preferably at least 95% by weight and more preferably at least 98% by weight, based on the overall solvent. The above-described embodiments of the solvent So apply to the solvent for the aqueous solution SS.

Preferably, in step c), the polymer gel is treated with an aqueous solution SS comprising 20% to 60% by weight, preferably 30% to 55% by weight, more preferably 40% to 50% by weight, based on the overall aqueous solution SS, of the at least one stabilizer St.

Preferably, the concentration of the stabilizer St is in the range from 0.1% to 10% by weight, preferably from 0.2% to 2% by weight, especially preferably from 0.25% to 1% by weight, based on the acrylamide polymer P, where the total mass is based on the sum total of all the monomers used. Alternatively, it is also possible to take the total mass of the dry acrylamide polymer P as the basis here. The concentration of the stabilizer St based on the acrylamide polymer is typically determined via the amount of the aqueous solution SS with which the polymer gel is treated and which is applied to the polymer gel in the process.

Preferably, the polymer gel is treated in step c) by spraying the aqueous solution SS onto the polymer gel or by mixing the polymer gel with the aqueous solution SS.

In a preferred embodiment, the polymer gel is treated in step c) by adding the aqueous solution SS to the polymer gel in a screw. Advantageously, the addition of the aqueous solution SS in a screw, for example a conveying screw or an extrusion screw, results in good mixing of the polymer gel with the aqueous solution SS. Screws typically comprise a screw trough or a screw pipe, a screw shaft with screw thread and a drive unit.

The aqueous solution SS can be added to the polymer gel in a conveying screw, in which case the conveying screw serves, for example, to remove the polymer gel from the polymerization reactor or to feed it and/or remove it from further comminution and/or drying steps after the polymerization. The addition is typically effected through holes in the outer screw pipe. The addition of the aqueous solution SS to the polymer gel in the screw can be effected, for example, via spray nozzles.

In a further preferred embodiment, the polymer gel is treated with the aqueous solution SS (step c)) in a pelletizing apparatus. In one embodiment, a pelletizing apparatus has a perforated plate and a knife for commuting the polymer gel (in a similar manner to a meat grinder). Often, a pelletizing apparatus comprises a screw (conveying screw, extrusion screw) which moves the polymer gel in the direction of the perforated plate. More particularly, in this embodiment, the aqueous solution SS can be added directly upstream of the knife or upstream of the perforated plate of the pelletizing apparatus and/or in the region of the conveying screw of the pelletizing apparatus. More particularly, such intimate mixing of the polymer gel and the aqueous solution SS can be effected before and/or during the comminution of the polymer gel. This embodiment is suitable both in the case of a continuous polymerization and in the case of a batchwise polymerization (see step b).

In a further preferred embodiment, the polymerization (step b) is effected continuously and the aqueous SS comprising the stabilizer St is added to the polymer gel in a conveying screw with which the polymer gel is discharged continuously from the polymerization reactor.

In a further preferred embodiment, the polymerization (step b) is effected batchwise, the polymer gel is withdrawn from the polymerization reactor as described above and the aqueous SS comprising the stabilizer St is added in an apparatus for comminuting the polymer gel, especially in an apparatus in which the polymer gel is comminuted with rotating knives (in a similar manner to a meat grinder). In the case of a batchwise polymerization in step b), the polymer gel can also be treated with the aqueous solution SS in the region of a conveying screw with which the polymer gel is sent to further process steps, for example a pelletizing apparatus and/or a drying apparatus.

In a further preferred embodiment, the polymer gel is treated in step c) by spraying the aqueous solution SS onto the polymer gel.

The spray application of the aqueous solution SS can be effected here, for example, after the first coarse comminution of the polymer gel after the withdrawal from the polymerization reactor to give polymer gel particles having a median diameter in the range from 5 to 50 cm.

In a further embodiment, the aqueous solution SS comprising at least one stabilizer St can be sprayed onto the polymer gel in a belt drier; the spray application is typically effected here onto the polymer gel distributed on the belt, before and/or on commencement of drying. Typically, this embodiment gives polymer gel pellets having a median size of the polymer gel particles in the range from 0.2 to 3 cm.

In a further embodiment, the aqueous solution SS comprising at least one stabilizer St can be sprayed onto the polymer gel in a fluidized bed drier; the spray application is typically effected here onto the polymer gel before and/or on commencement of drying. Typically, this embodiment gives polymer gel pellets having a median size of the polymer gel particles in the range from 0.2 to 3 cm.

In a particularly preferred embodiment, the aqueous solution SS is sprayed onto the polymer gel in step c) with prior comminution of the polymer gel so as to obtain a median size of the polymer gel particles in the range from 0.2 to 3 cm.

In a preferred embodiment, the polymer gel in step c) has a water content in the range from 50% to 80% by weight, preferably from 60% to 75% by weight, more preferably from 60% to 70% by weight, based on the overall polymer gel.

In a preferred embodiment, the polymer gel in step c) has a water content in the range from 60% to 75% by weight, more preferably from 60% to 70% by weight, based on the overall polymer gel.

Preferably, the polymerization product obtained in step b) (acrylamide polymer P in the form of a polymer gel) is used without drying in the downstream steps, especially in downstream step c).

Alternatively, it is possible to remove a portion of the solvent So from the polymer gel, if the water content of the polymer gel is as required in step c).

Optional Step d)—Drying

The treatment of the polymer gel with the aqueous solution SS is preferably followed by drying of the polymer gel in the optional step d). The drying can be effected, for example, in a fluid bed drier or a belt drier. The person skilled in the art is aware of processes and apparatus for drying the polymer gel. Preferably, the polymer gel is pelletized prior to drying to obtain polymer gel pellets having a median particle diameter in the range from 0.3 to 2 cm.

Preferably, the process of the invention comprises, as step d), the drying of the polymer gel at temperatures below 100° C., preferably at temperatures in the range from 40 to 60° C. To avoid conglutination, a suitable separating agent can be added to the composition. Typically, the separating agent is used in the pelletization of the composition. Typically, the drying affords a composition comprising at least one acrylamide copolymer P and at least one stabilizer St in the form of pellets or powder.

Optional Step e)—Comminution of the Polymer Gel

The process of the invention may comprise, in one or more optional steps e), the comminution of the polymer gel formed in step b) and/or step c).

Typically, the polymer gel after the above-described polymerization (step b) is in the form of a gel block. This polymer gel can first be comminuted in one or more steps e). The comminuting can be effected with the aid of the processes known to those skilled in the art, for example with the aid of an extrusion screw, an apparatus in which the polymer gel is comminuted with rotating knives (in a similar manner to a meat grinder), and/or a pelletizing apparatus.

In one embodiment, the polymer gel is comminuted in step e) in such a way that a coarse comminution of the polymer gel block is effected first. A coarse comminution is obtained, for example, in an apparatus in which the polymer gel is comminuted with rotating knives (in a similar manner to a meat grinder). Typically, this coarse comminution can give polymer gel particles having a median diameter in the range from 5 to 50 cm.

It is possible to further comminute the polymer gel before or after the treatment with the aqueous solution SS (process step c of the invention), for example in a pelletizing apparatus. Typically, a pelletizing apparatus has a perforated plate and a knife for comminuting the polymer gel (in a similar manner to a meat grinder). The size of the resultant polymer gel particles can typically be determined via the choice of perforated plate, i.e. the size of the holes in the perforated plate. Typically, a pelletizing apparatus can give polymer particles having a median diameter in the range from 0.3 to 2 cm, preferably 0.5 to 2 cm.

Further Process Steps

The process of the invention may optionally comprise further process steps, for example blending, extruding and/or grinding. It is possible, for example, to grind the polymer gel, especially after the drying (optional step d)), to give a polymer powder. This can be effected with the aid of suitable apparatuses known to those skilled in the art, for example with the aid of a centrifugal mill.

The composition obtained by the process of the invention, comprising at least one acrylamide polymer P and at least one stabilizer St, is typically used in the form of an aqueous solution in the course of employment (polymer flooding) at the site of use, and is therefore typically dissolved in water on site. In the course of this, there may typically be unwanted formation of lumps. In order to avoid this, an auxiliary which accelerates or improves the dissolution of the dried polymer in water may be added at the early stage of the synthesis to the described compositions comprising acrylamide polymer P and stabilizer St.

The aqueous solution SS is preferably produced by dissolving the at least one stabilizer St and optionally further additives in water or a mixture of water with a water-miscible organic solvent.

The present invention is elucidated in detail by the examples which follow.

EXAMPLES

Example 1 Preparation of the Acrylamide Copolymers 1.1 Preparation of the Macromonomer Used (Monomer a))
Abbreviations
HBVE hydroxybutyl vinyl ether, $H_2C=CH-O-(CH_2)_4-OH$
EO ethylene oxide
BuO butylene oxide (>85% by weight of 1,2-butylene oxide)

By alkoxylation of HBVE with 24.5 units of EO, followed by 16 units of BuO, followed by 3.5 units of EO, a macromonomer (monomer (a)) of the following formula was prepared:

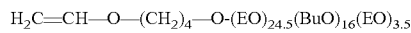

$H_2C=CH-O-(CH_2)_4-O-(EO)_{24.5}(BuO)_{16}(EO)_{3.5}$

A 2 L pressure autoclave with anchor stirrer was initially charged with 135.3 g (1.16 mol) of hydroxybutyl vinyl ether (HBVE) (stabilized with 100 ppm potassium hydroxide (KOH)), and the stirrer was switched on. 1.06 g of potassium methoxide (KOMe) solution (32% KOMe in methanol (MeOH), corresponds to 0.0048 mol of potassium) were fed in and the stirred vessel was evacuated to a pressure of 10-20 mbar, heated to 65° C., and operated at 65° C. and a pressure of 10-20 mbar for 70 min. MeOH was distilled off. The vessel was purged three times with $N_2$ (nitrogen). Thereafter, the vessel was checked for pressure retention, a pressure of 0.5 bar gauge (1.5 bar absolute) was established and the vessel was heated to 120° C. The vessel was decompressed to 1 bar absolute and 1126 g (25.6 mol) of ethylene oxide (EO) were metered in until $p_{max}$ was 3.9 bar absolute and $T_{max}$ was 150° C. After 300 g EO had been metered in, the metered addition was stopped (about 3 h after commencement), and the mixture was left for 30 min and decompressed to 1.3 bar absolute. Thereafter, the rest of the EO was metered in. The metered addition of EO including the decompression took a total of 10 h.

The mixture was stirred at about 145-150° C. until pressure was constant (1 h), cooled to 100° C. and freed of low boilers at a pressure of less than 10 mbar for 1 h. The material was dispensed at 80° C. under $N_2$.

Analysis (OH number, GPC, 1H NMR in $CDCl_3$, 1H NMR in MeOD) confirmed the structure HBVE-22EO.

A 2 L pressure autoclave with anchor stirrer was initially charged with 588.6 g (0.543 mol) of HBVE-22EO, and the stirrer was switched on. Thereafter, 2.39 g of 50% NaOH solution (0.030 mol of NaOH, 1.19 g of NaOH) were added, a reduced pressure of <10 mbar was applied, and the mixture was heated to 100° C. and kept at that temperature for 80 min, in order to distill off the water. The vessel was purged three times with $N_2$. Thereafter, the vessel was checked for pressure retention, a pressure of 0.5 bar gauge (1.5 bar absolute) was set, the mixture was heated to 127° C. and then the pressure was adjusted to 1.6 bar absolute. 59.7 g (1.358 mol) of EO were metered in at 127° C.; $p_m$ was 3.9 bar absolute. The mixture was left for min until a constant pressure was established, then decompressed to 1.0 bar absolute. 625.5 g (8.688 mol) of BuO (butylene oxide) were metered in at 127° C.; $p_{max}$ was 3.1 bar absolute. An intermediate decompression was conducted because of the increase in the fill level. The metered addition of BuO was stopped, and the mixture was left to react for 1 h until the pressure was constant and decompressed to 1.0 bar absolute. Thereafter, the metered addition of BuO was continued. $P_{max}$ was still 3.1 bar (first decompression after 610 g of BuO, total metering time for BuO 8 h including wait for decompression). After the metered addition of BuO had ended, reaction was allowed to continue for 8 h and the mixture was then heated to 135° C. The vessel was decompressed to 1.6 bar absolute. Thereafter, 83.6 g (1.901 mol) of EO (ethylene oxide) was metered in at 135° C.; $p_{max}$ was 3.1 bar absolute. After the metered addition of EO had ended, reaction was allowed to continue for 4 h. The mixture was cooled to 100° C.; residual oxide was drawn off until the pressure was below 10 mbar for at least 10 min. Then 0.5% water was added at 120° C., followed by drawing-off until the pressure was below 10 mbar for at least 10 min. The vacuum was broken with $N_2$, and 100 ppm BHT were added. Dispensing was effected at 80° C. under $N_2$.

Analysis (mass spectrum, GPC, 1H NMR in CDCl3, 1H NMR in MeOD) confirmed the mean composition HBVE-24.5EO-16 BuO-3.5 EO.

1.2 Preparation of the Acrylamide Copolymers

In examples P1 to P5 and comparative examples C1 to C5 which follow, acrylamide copolymers comprising 47.6% by weight of acrylamide, 50.5% by weight of the sodium salt of 2-acrylamido-2-methylpropanesulfonic acid (Na-ATBS) and 1.9% by weight of the macromonomer described above under 1.1 were prepared.

In examples P6 to P10 and comparative examples C6 to C11 which follow, acrylamide copolymers comprising 69.4% by weight of acrylamide and 30.6% by weight of sodium acrylate (monomer b2) were prepared.

Each polymerization was effected by means of adiabatic gel polymerization.

The stabilizer St used was sodium 2-mercaptobenzothiazole (Na-MBT), with addition of various amounts of sodium 2-mercaptobenzothiazole (Na-MBT) in the range from 0% to 1% by weight, based on the total weight of the monomers, in different ways.

The acrylamide copolymers P1 to P10 and C1 to C11 were characterized as described in example 2. The results are compiled in tables 1 and 2.

Comparative Example C1 Without Addition of Na-MBT (Blank Experiment)

A plastic bucket having a magnetic stirrer, pH meter and thermometer was initially charged with 146.36 g of a 50% aqueous solution of Na-ATBS and then the following were added successively: 105.8 g of distilled water, 0.4 g of a commercial silicone-based defoamer (Dow Corning® Antifoam Emulsion RD), 2.8 g of the above-described macromonomer, 132.47 g of acrylamide (50% solution in water), 1.2 g of a 5% aqueous solution of diethylentriaminepentaacetic acid, pentasodium salt, and 3.0 g of the nonionic surfactant Lutensol® TO 15 (iC13-(EO)$_{15}$H).

After adjustment to pH 6.4 with a 20% or 2% sulfuric acid solution and addition of the rest of the water to attain the desired monomer concentration of 37% by weight (total amount of water minus the amount of water already added, minus the amount of acid required), the monomer solution was adjusted to the initiation temperature of 2° C. The solution was transferred to a thermos flask, the temperature sensor for the temperature recording was attached and the mixture was purged with nitrogen for 30 minutes, and the polymerization was initiated with 1.6 mL of a 10% aqueous solution of the water-soluble azo initiator 2,2'-azobis(2-methyl-propionamidine) dihydrochloride (Wako V-50), 0.12 mL of a 1% t-BHPO solution (tert-butyl hydroperoxide) and 0.24 mL of a 1% sodium sulfite solution. With the onset of the polymerization, the temperature rose to 80° C. to 90° C. within about 25 minutes. A solid polymer gel was obtained.

After the polymerization, the gel block was comminuted with the aid of a meat grinder. The gel pellets obtained were dried in a fluidized bed drier at 55° C. for two hours. This gave hard white pellets which were converted to a pulverulent state by means of a centrifugal mill.

Comparative Example C2 Addition of Na-MBT to the Polymerization Mixture in an Amount of 0.1% by Weight, Based on the Acrylamide Copolymer A plastic bucket having a magnetic stirrer, pH meter and thermometer was initially charged with 146.36 g of a 50% aqueous solution of Na-ATBS and then the following were added successively: 105.8 g of distilled water, 0.4 g of a commercial silicone-based defoamer (Dow Corning@Antifoam Emulsion RD), 2.8 g of the above-described macromonomer according to 1.1, 132.47 g of acrylamide (50% solution in water), 1.2 g of a 5% aqueous solution of diethylentriaminepentaacetic acid, pentasodium salt, and 3.0 g of the nonionic surfactant Lutensol® TO 15 (iC13-(EO)$_{15}$H). Subsequently, 0.16 g of sodium 2-mercaptobenzothiazole (Na-MBT) was added.

After adjustment to pH 6.4 with a 20% or 2% sulfuric acid solution and addition of the rest of the water to attain the desired monomer concentration of 37% by weight (total amount of water minus the amount of water already added, minus the amount of acid required), the monomer solution was adjusted to the initiation temperature of 2° C. The solution was transferred to a thermos flask, the temperature sensor for the temperature recording was attached and the mixture was purged with nitrogen for 30 minutes, and the polymerization was initiated with 1.6 mL of a 10% aqueous solution of the water-soluble azo initiator 2,2'-azobis(2-methyl-propionamidine) dihydrochloride (Wako V-50), 0.12 mL of a 1% t-BHPO solution and 0.24 mL of a 1% sodium sulfite solution. With the onset of the polymerization, the temperature rose to 80° C. to 90° C. within about 25 minutes.

A solid polymer gel was obtained. After the polymerization, the gel block was comminuted with the aid of a meat grinder. The gel pellets obtained were dried in a fluidized bed drier at 55° C. for two hours. This gave hard white pellets which were converted to a pulverulent state by means of a centrifugal mill.

Comparative Examples C3 to C5 Addition of Na-MBT to the Polymerization Mixture Acrylamide copolymers C3 to C5 were prepared as described above under example C2, except with addition of different amounts of sodium 2-mercaptobenzothiazole to the polymerization mixture. Concentrations of Na-MBT of 0.25% by weight, 0.5% by weight and 0.75% by weight, based in each case on the acrylamide copolymer, were obtained.

Example P1 Spray Application of an Aqueous Solution of Na-MBT to the Moist Polymer Gel A plastic bucket having a magnetic stirrer, pH meter and thermometer was initially charged with 146.36 g of a 50% aqueous solution of Na-ATBS and then the following were added successively: 105.8 g of distilled water, 0.4 g of a commercial silicone-based defoamer (Dow Corning® Antifoam Emulsion RD), 2.8 g of the above-described macromonomer, 132.47 g of acrylamide (50% solution in water), 1.2 g of a 5% aqueous solution of diethylentriaminepentaacetic acid, pentasodium salt, and 3.0 g of the nonionic surfactant Lutensol® TO 15 (iC13-(EO)$_{15}$H).

After adjustment to pH 6.4 with a 20% or 2% sulfuric acid solution and addition of the rest of the water to attain the desired monomer concentration of 37% by weight (total amount of water minus the amount of water already added, minus the amount of acid required), the monomer solution was adjusted to the initiation temperature of 2° C. The solution was transferred to a thermos flask, the temperature sensor for the temperature recording was attached and the mixture was purged with nitrogen for 30 minutes, and the polymerization was initiated with 1.6 mL of a 10% aqueous solution of the water-soluble azo initiator 2,2'-azobis(2-methyl-propionamidine) dihydrochloride (Wako V-50), 0.12 mL of a 1% t-BHPO solution and 0.24 mL of a 1% sodium sulfite solution. With the onset of the polymerization, the temperature rose to 80° C. to 90° C. within about 25 minutes. A solid polymer gel was obtained.

After the polymerization, the gel block was comminuted with the aid of a meat grinder. Thereafter, onto the moist polymer gel a solution SS comprising 30% by weight of Na-MBT was sprayed and mixed with the polymer gel. A concentration of Na-MBT of 0.1% by weight, based on the acrylamide copolymer, was obtained.

The median size of the gel particles was in the range from 5 to 20 mm. The water content of each polymer gel corresponds to the water content in the monomer solution MS.

The resultant gel pellets were dried in a fluidized bed drier at 55° C. for two hours. This gave hard white pellets which were converted to a pulverulent state by means of a centrifugal mill.

Examples P2 to P5 Spray Application of an Aqueous Solution of Na-MBT to the Moist Polymer Gel Acrylamide copolymers P2 to P5 were prepared as described above in example P1, except with spray application of different amounts of sodium 2-mercaptobenzothiazole to the moist polymer gel. Concentrations of Na-MBT of 0.25% by weight, 0.5% by weight, 0.75% by weight and 1.00% by weight, based on the acrylamide copolymer, were obtained.

Comparative Example C6 without Addition of Na-MBT (Blank Experiment)

A plastic bucket having a magnetic stirrer, pH meter and thermometer was initially charged with 104.92 g of a 35% solution of sodium acrylate, and then the following were added successively: 108.33 g of distilled water, 160.16 g of acrylamide (50% solution), 1.2 g of Trilon C (5% solution) and 3 mL of a 4% ACVA solution.

After adjustment to pH 6.0 with a 20% or 2% sulfuric acid solution and addition of the residual water (total amount of water minus the amount of water already added, minus the amount of acid required), the monomer solution was adjusted to the initiation temperature of 0° C. The solution was transferred to a thermos flask, the temperature sensor for the temperature recording was attached and the mixture was purged with nitrogen for 30 minutes, and the polymerization was initiated with 3 mL of a 4% AIBN solution in methanol, 0.09 mL of a 1% t-BHP solution and 0.18 mL of a 1% sodium sulfite solution.

Thereafter, the gel block was comminuted with the aid of a meat grinder and the resultant gel pellets were dried in a fluidized bed drier at 55° C. for two hours. This gave hard white pellets which were converted to a pulverulent state by means of a centrifugal mill.

Comparative examples C7 to C10 Addition of Na-MBT to the polymerization mixture

Acrylamide copolymers C7 to C10 were prepared as described above in example C6, except with addition of different amounts of sodium 2-mercaptobenzothiazole to the polymerization mixture, namely 0.25% by weight, 0.5% by weight and 0.75% by weight, based in each case on the acrylamide copolymer. The addition of Na-MBT was effected in accordance with example C2.

Comparative Example C 11 Spray Application of an Aqueous Solution of Na-MBT to the Dried Polymer Gel An acrylamide copolymer C11 was prepared as described in example C6, except with spray application of an aqueous sodium 2-mercaptobenzothiazole solution to the dried polymer gel. A concentration of Na-MBT of 0.75% by weight, based on the acrylamide copolymer, was obtained.

The gel block which was obtained after the polymerization as in comparative example C6 was comminuted with the aid of a meat grinder and the resultant gel pellets were dried in a fluidized bed drier at 55° C. for two hours. This gave hard white pellets which were converted to a pulverulent state by means of a centrifugal mill.

In a paddle wheel mixer, a 30% by weight solution of Na-MBT was sprayed onto the polymer powder and mixed with the polymer powder by the motion of the paddle wheels. After drying, the polymer powder had a solids content of about 92% by weight. This solids content fell to about 89% by weight as a result of the addition of the Na-MBT solution.

Example P6 Spray Application of an Aqueous Solution of Na-MBT to the Moist Polymer Gel A plastic bucket having a magnetic stirrer, pH meter and thermometer was initially charged with 104.92 g of a 35% solution of sodium acrylate, and then the following were added successively: 108.33 g of distilled water, 160.16 g of acrylamide (50% solution), 1.2 g of Trilon C (5% solution) and 3 mL of a 4% 4,4'-azobis-4-cyanovaleric acid (ACVA) solution.

After adjustment to pH 6.0 with a 20% or 2% sulfuric acid solution and addition of the residual water (total amount of water minus the amount of water already added, minus the amount of acid required), the monomer solution was adjusted to the initiation temperature of 0° C. The solution was transferred to a thermos flask, the temperature sensor for the temperature recording was attached and the mixture was purged with nitrogen for 30 minutes, and the polymerization was initiated with 3 mL of a 4% AIBN solution in methanol, 0.09 mL of a 1% t-BHP solution and 0.18 mL of a 1% sodium sulfite solution.

After the polymerization, the gel block was comminuted with the aid of a meat grinder. Thereafter, onto the moist polymer gel a solution SS comprising 30% by weight of Na-MBT was sprayed and mixed with the polymer gel. A concentration of Na-MBT of 0.1% by weight, based on the acrylamide copolymer, was obtained.

The median size of the gel particles was in the range from 5 to 20 mm. The water content of each polymer gel corresponds to the water content in the monomer solution MS.

The resultant gel pellets were dried in a fluidized bed drier at 55° C. for two hours. This gave hard white pellets which were converted to a pulverulent state by means of a centrifugal mill.

Examples P7 to P10 Spray Application of an Aqueous Solution of Na-MBT to the Moist Polymer Gel Acrylamide copolymers P7 to P10 were prepared as described above in example P6, except with spray application of different amounts of sodium 2-mercaptobenzothiazole to the moist polymer gel. Concentrations of Na-MBT of 0.25% by weight, 0.5% by weight, 0.75% by weight and 1.00% by weight, based on the acrylamide copolymer, were obtained.

2 Characterization of the Acrylamide Copolymers
2.1 Determination of Viscosity

The viscosity of the acrylamide copolymers C1 to C5 and P1 to P5 was measured in synthetic seawater at 60° C. with a polymer concentration of 2000 ppm. The viscosity of the acrylamide copolymers C6 to C11 and P6 to P10 was measured in a salt solution comprising 12 261 ppm NaCl, 362 ppm $CaCl_2$ and 309 ppm $MgCl_2$, at 25° C. with a polymer concentration of 1500 ppm.

The viscosity was measured with a Brookfield LVDV-II viscometer having a UL adapter. A speed of rotation of 6 rpm was used.

2.2 Determination of Gel Content

In each case 0.1 g of the acrylamide copolymers obtained in 1.2 (acrylamide copolymers C1 to C11 and P1 to P10) was dissolved in 1 L of tap water at 25° C. (concentration 1000 ppm). The solution was filtered through a 200 μm sieve and the amount of polymer gel remaining on the sieve was determined.

2.3 Determination of Filterability—MPFR (Millipore Filtration Ratio)

In addition, the filterability of the acrylamide copolymers C1 to C11 and P1 to P10 was examined with the aid of the MPFR value (Millipore filtration ratio). The MPFR value (Millipore filtration ratio) indicates the deviation of a polymer solution from ideal filtration behavior, with no reduction in the filtration rate as a result of blockage of the filter in the case of ideal filtration behavior.

To determine the MPFR values, about 200 mL of polymer solution having a concentration of 1000 ppm were filtered at a pressure of $1.38 \times 10^5$ Pa through a polycarbonate filter having a pore size of 5 μm. In the course of this, the amount of filtrate was recorded as a function of time. The MPFR value was calculated according to the following formula:

$$\text{MPFR}=(t_{180g}-t_{160g})/(t_{80g}-t_{60g}),$$

with $t_{index}$=time before measurement of the amount of filtrate reported, i.e. $t_{180g}$ is the time before 180 g of filtrate were measured. According to API RP 63 ("Recommended Practices for Evaluation of Polymers Used in Enhanced Oil Recovery Operations", American Petroleum Institute), values of less than 1.3 are acceptable. In the case of ideal filterability, the MPFR value is 1.

3. Results

The acrylamide copolymers (C1 to C11 and P1 to P10) obtained according to example 1.2 were characterized as described above. The results are summarized in tables 1 and 2 below.

TABLE 1

Acrylamide copolymers (C1 to C5 and P1 to P5) formed from acrylamide, Na—ATBS and macromonomer according to 1.1

Addition of Na—MBT

| Example | Mode of addition | % by weight based on polymer | Viscosity [mPas] | Gel content [mL] | MPFR |
|---|---|---|---|---|---|
| C1 | — | 0 | 190 | 1 | 1.30 |
| C2 | to monomer solution | 0.10 | 200 | <1 | 1.30 |
| C3 | to monomer solution | 0.25 | 210 | 0 | 1.25 |
| C4 | to monomer solution | 0.50 | 150 | 0 | 1.20 |
| C5 | to monomer solution | 0.75 | 120 | 0 | 1.22 |
| P1 | spray application to moist gel | 0.10 | 220 | 0 | 1.27 |
| P2 | spray application to moist gel | 0.25 | 230 | 0 | 1.16 |
| P3 | spray application to moist gel | 0.50 | 250 | 0 | 1.0 |
| P4 | spray application to moist gel | 0.75 | 270 | 0 | 1.0 |
| P5 | spray application to moist gel | 1.00 | 270 | 0 | 1.0 |

TABLE 2

Acrylamide copolymers (C6 to C11 and P6 to P10) formed from acrylamide and sodium acrylate Addition of Na—MBT

| Example | Mode of addition | % by weight based on polymer | Viscosity [mPas] | Gel content [mL] | MPFR |
|---|---|---|---|---|---|
| C6 | — | 0 | 25 | 1 | 1.29 |
| C7 | to monomer solution | 0.10 | 27 | <1 | 1.20 |
| C8 | to monomer solution | 0.25 | 28 | 0 | 1.15 |
| C9 | to monomer solution | 0.50 | Na—MBT precipitates out | | |
| C10 | to monomer solution | 0.75 | Na—MBT precipitates out | | |
| C11 | spray application to dry gel | 0.75 | 24 | 1 | 1.30 |
| P6 | spray application to moist gel | 0.10 | 28 | 0 | 1.21 |
| P7 | spray application to moist gel | 0.25 | 31 | 0 | 1.14 |
| P8 | spray application to moist gel | 0.50 | 32 | 0 | 1.02 |
| P9 | spray application to moist gel | 0.75 | 34 | 0 | 1.01 |
| P10 | spray application to moist gel | 1.00 | 34 | 0 | 1.04 |

It has been found that, surprisingly, the spray application of Na-MBT to the moist polymer gel increases the viscosity of the polymer and reduces the MPFR value. This is not the case when the Na-MBT is only sprayed onto the dried polymer (see C11). Comparative examples C1 to C10 show that, given the same amount of the stabilizer, higher viscosities and lower MPFR values are obtained when the stabilizer (Na-MBT) is not added directly to the monomer solution but applied to the moist polymer gel directly after the gel polymerization. The treatment of the moist polymer gel with the stabilizer has an advantageous effect on the polymer properties. It is found that the insoluble gel fractions in the acrylamide copolymer can be distinctly reduced with the aid of the preparation process of the invention. This process variant thus led to a distinct improvement in the properties of the acrylamide copolymers with respect to the use thereof in tertiary mineral oil production.

It is additionally advantageous that higher concentrations of Na-MBT can be obtained by the process of the invention, whereas the addition of Na-MBT to the monomer solution is limited because of other factors. For example, the Na-MBT can precipitate out at relatively high concentrations in the polymerization mixture (monomer solution MS) (see table 2).

The invention claimed is:

1. A process for producing a composition comprising at least one water-soluble acrylamide polymer P and at least one stabilizer St, comprising the following steps:
   a) providing an aqueous monomer solution MS comprising 20% to 45% by weight, based on the total amount of all the components of the aqueous monomer solution MS, of at least one ethylenically unsaturated monomer, at least one monomer being (meth)acrylamide, at least one initiator I for the free-radical polymerization and at least one solvent So comprising at least 50% by weight, based on the overall solvent So, of water;

b) polymerizing the aqueous monomer solution MS to obtain the acrylamide polymer P in the form of a polymer gel;

c) treating the polymer gel having a water content in the range from 50% to 80% by weight, based on the overall polymer gel, with an aqueous solution SS comprising at least one stabilizer St, wherein the stabilizer St is at least one mercapto compound selected from the group consisting of 2-mercaptobenzothiazole and salts thereof;

d) optionally drying the polymer gel from step c.

2. The process for producing a composition according to claim 1, wherein the monomer solution MS comprises the following monomers:

30% to 100% by weight of (meth)acrylamide;
0% to 70% by weight of at least one anionic, monoethylenically unsaturated, hydrophilic monomer (b2);
0% to 70% by weight of at least one cationic, monoethylenically unsaturated, hydrophilic monomer (b3);
0% to 15% by weight of at least one monoethylenically unsaturated monomer other than (meth)acrylamide and the monomers (b2) and (b3);
where the amounts are each based on the total amounts of all the monomers in the monomer solution MS.

3. The process for producing a composition according to claim 1, wherein the monomer solution MS comprises the following monomers:

60% to 75% by weight of (meth)acrylamide;
25% to 40% by weight of at least one monoethylenically unsaturated hydrophilic monomer (b) selected from the group consisting of anionic, monoethylenically unsaturated, hydrophilic monomers (b2) and cationic, monoethylenically unsaturated, hydrophilic monomers (b3),
where the amounts are each based on the total amounts of all the monomers in the monomer solution MS.

4. The process for producing a composition according to claim 1, wherein the monomer solution MS comprises, as well as (meth)acrylamide, additionally at least one hydrophilic, monoethylenically unsaturated anionic monomer (b2) comprising at least one acidic group selected from —COOH, —SO$_3$H or —PO$_3$H$_2$ and salts thereof, and/or comprises at least one cationic, monoethylenically unsaturated, hydrophilic monomer (b3) comprising ammonium groups.

5. The process for producing a composition according to claim 1, wherein the monomer solution MS comprises at least one monomer selected from the group consisting of (meth)acrylamide, 2-acrylamido-2-methylpropanesulfonic acid, acrylic acid and their respective salts, with the proviso that at least 10% by weight, based on the total amount of all the monomers, of (meth)acrylamide is present.

6. The process for producing a composition according to claim 1, wherein the monomer solution MS comprises the following monomers:

30% to 100% by weight of (meth)acrylamide;
0% to 15% by weight of at least one monoethylenically unsaturated, hydrophobically associating monomer (a);
0% to 70% by weight of at least one anionic, monoethylenically unsaturated, hydrophilic monomer (b2);
0% to 70% by weight of at least one cationic, monoethylenically unsaturated, hydrophilic monomer (b3);
0% to 15% by weight of at least one monoethylenically unsaturated monomer other than (meth)acrylamide and the monomers (a), (b2) and (b3);

where the amounts are each based on the total amounts of all the monomers in the monomer solution MS, and with the proviso that the sum total of the monomers mentioned is 100% by weight.

7. The process for producing a composition according to claim 1, wherein the proportion of (meth)acrylamide in the monomer solution MS is at least 45% by weight, based on the total amount of all the monomers.

8. The process for producing a composition according to claim 1, wherein the aqueous solution SS comprises 20% to 60% by weight, based on the overall aqueous solution SS, of the at least one stabilizer St.

9. The process for producing a composition according to claim 1, wherein the stabilizer St is sodium 2-mercaptobenzothiazole.

10. The process for producing a composition according to claim 1, wherein the concentration of the stabilizer St is in the range from 0.1% to 10% by weight, based on the acrylamide polymer P, where the total mass is based on the sum total of all the monomers used.

11. The process for producing a composition according to claim 1, wherein the treating of the polymer gel in step c) is effected by adding the aqueous solution SS to the polymer gel in a screw.

12. The process for producing a composition according to claim 1, wherein the treating of the polymer gel in step c) is effected by spraying the aqueous solution SS onto the polymer gel.

13. The process for producing a composition according to claim 1, wherein the polymer gel in step c) has a water content in the range from 60% to 75% by weight, based on the overall polymer gel.

14. The process for producing a composition according to claim 1, wherein the process comprises, as step d), the drying of the polymer gel at temperatures below 100° C.

15. The process for producing a composition according to claim 1, wherein the monomer solution MS comprises the following monomers:

59% to 75% by weight, of (meth)acrylamide;
1% to 40% by weight, of at least one anionic, monoethylenically unsaturated, hydrophilic monomer (b2);
1% to 40% by weight, of at least one cationic, monoethylenically unsaturated, hydrophilic monomer (b3);
0% to 15% by weight of at least one monoethylenically unsaturated monomer other than (meth)acrylamide and the monomers (b2) and (b3);
where the amounts are each based on the total amounts of all the monomers in the monomer solution MS.

16. The process for producing a composition according to claim 1, wherein the monomer solution MS comprises at least one monomer selected from the group consisting of (meth)acrylamide, 2-acrylamido-2-methylpropanesulfonic acid, acrylic acid and their respective salts, with the proviso that at least 15% by weight, based on the total amount of all the monomers, of (meth)acrylamide is present.

17. The process for producing a composition according to claim 1, wherein the monomer solution MS comprises at least one monomer selected from the group consisting of (meth)acrylamide, 2-acrylamido-2-methylpropanesulfonic acid, acrylic acid and their respective salts, with the proviso more than 45% by weight, based on the total amount of all the monomers, of (meth)acrylamide is present.

18. The process for producing a composition according to claim 1, wherein the aqueous solution SS comprises 30% to 55% by weight, based on the overall aqueous solution SS, of the at least one stabilizer St.

19. The process for producing a composition according to claim 1, wherein the aqueous solution SS comprises 40% to 50% by weight, based on the overall aqueous solution SS, of the at least one stabilizer St.

20. The process for producing a composition according to claim 1, wherein the concentration of the stabilizer St is in the range from 0.2% to 2% by weight, based on the acrylamide polymer P, where the total mass is based on the sum total of all the monomers used.

21. The process for producing a composition according to claim 1, wherein the concentration of the stabilizer St is in the range from 0.25% to 1% by weight, based on the acrylamide polymer P, where the total mass is based on the sum total of all the monomers used.

* * * * *